US012452388B2

(12) United States Patent
Cordourier Maruri et al.

(10) Patent No.: US 12,452,388 B2
(45) Date of Patent: Oct. 21, 2025

(54) METHODS AND APPARATUS TO ENABLE PRIVATE VERBAL SIDE CONVERSATIONS IN VIRTUAL MEETINGS

(71) Applicant: Intel Corporation, Santa Clara, CA (US)

(72) Inventors: Hector Cordourier Maruri, Guadalajara (MX); Jose Rodrigo Camacho Perez, Guadalajara (MX); Julio Cesar Zamora Esquivel, West Sacramento, CA (US); Willem Beltman, West Linn, OR (US); Paulo Lopez Meyer, Zapopan (MX); Alejandro Ibarra Von Borstel, Manchaca, TX (US)

(73) Assignee: Intel Corporation, Santa Clara, CA (US)

( * ) Notice: Subject to any disclaimer, the term of this patent is extended or adjusted under 35 U.S.C. 154(b) by 792 days.

(21) Appl. No.: 17/483,433

(22) Filed: Sep. 23, 2021

(65) Prior Publication Data
US 2022/0014712 A1 Jan. 13, 2022

(51) Int. Cl.
H04N 7/15 (2006.01)
H04L 12/18 (2006.01)
H04N 21/439 (2011.01)
H04N 21/4788 (2011.01)

(52) U.S. Cl.
CPC ........... *H04N 7/15* (2013.01); *H04L 12/1813* (2013.01); *H04N 21/439* (2013.01); *H04N 21/4788* (2013.01)

(58) Field of Classification Search
CPC .... H04N 7/15; H04N 21/439; H04N 21/4788; H04L 12/1813; H04L 12/1827; H04S 7/30; H04S 2400/11; H04S 2420/01; H04M 3/564; H04M 3/568
See application file for complete search history.

(56) References Cited

U.S. PATENT DOCUMENTS 10,231,056 B2   3/2019  Poornachandran et al.
11,683,447 B2*  6/2023  Lin .......................... H04N 7/15
                                                            715/753

(Continued)

FOREIGN PATENT DOCUMENTS

EP          4203515 A1    6/2023

*Primary Examiner* — Phung-Hoang J Nguyen
(74) *Attorney, Agent, or Firm* — Hanley, Flight & Zimmerman, LLC

(57) ABSTRACT

An example apparatus including processor circuitry to execute instructions to join a video conferencing meeting including a first audio channel, the first audio channel including first binaural audio at a first angle; in response to a user joining a second audio channel in the video conferencing meeting, select a second angle for the second audio channel and a third angle for the first audio channel; generate a superimposed binaural audio including second binaural audio and third binaural audio; and output the superimposed binaural audio such that first audio data from the first audio channel included in the third binaural audio is to appear to originate from a first position based on the third angle and second audio data from the second audio channel included in the second binaural audio is to appear to originate from a second position based on the second angle.

19 Claims, 9 Drawing Sheets

(56) References Cited

U.S. PATENT DOCUMENTS

| | | | |
|---|---|---|---|
| 2008/0260131 A1* | 10/2008 | Akesson | H04M 3/568 379/202.01 |
| 2012/0017149 A1* | 1/2012 | Lai | H04L 65/403 715/758 |
| 2013/0198657 A1* | 8/2013 | Jones | H04L 12/1827 715/753 |
| 2015/0052455 A1* | 2/2015 | Boustead | H04M 3/568 715/753 |
| 2018/0206021 A1 | 7/2018 | Sindia et al. | |
| 2023/0068117 A1* | 3/2023 | Johnston | H04L 65/403 |

* cited by examiner

METHODS AND APPARATUS TO ENABLE PRIVATE VERBAL SIDE CONVERSATIONS IN VIRTUAL MEETINGS

FIELD OF THE DISCLOSURE

This disclosure relates generally to video conferencing and, more particularly, to methods and apparatus to enable private verbal side conversations in virtual meetings.

BACKGROUND

Virtual conferencing platforms and video conferencing platforms are indispensable tools for collaboration in most industrial, commercial, academic, and governmental environments. In some examples, interactions through remote communication platforms represent a large amount of the total interactions happening in large organizations. Virtual conferencing platforms and video conferencing platforms provide a one-to-all type of interaction where all participants in a meeting will hear the same audio and see the same visual data at all times.

Figure 1:
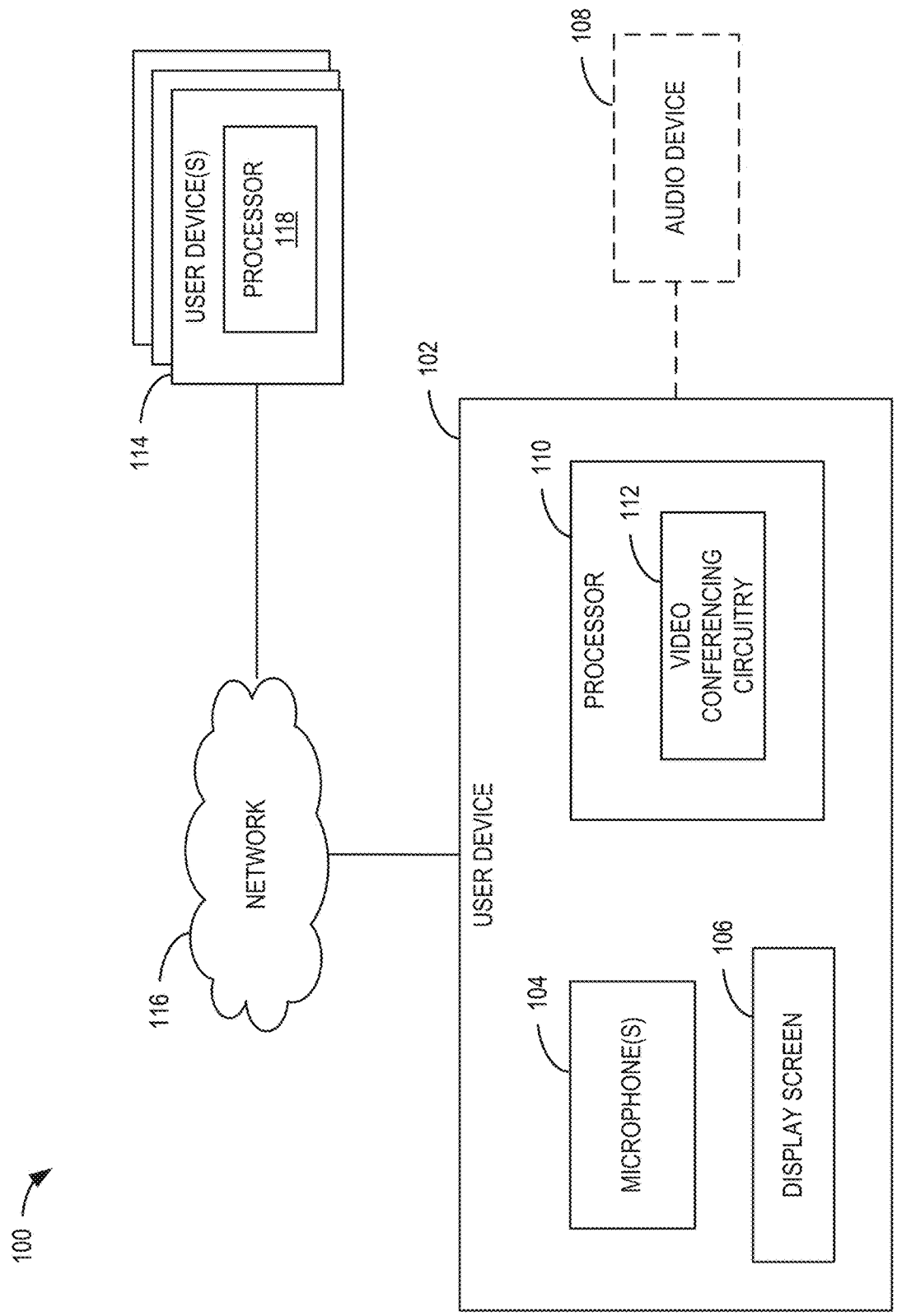
FIG. 1 is a schematic illustration of an example environment in which teachings of this disclosure may be implemented.

The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Virtual conferencing platforms and video conferencing platforms are indispensable tools for collaboration in most industrial, commercial, academic, and governmental environments. In some examples, interactions through remote communication platforms represent a large amount of the total interactions occurring in large organizations. However, these platforms have several limitations in comparison with in-person meetings. Virtual conferencing platforms and video conferencing platforms provide a one-to-all type of interaction where all participants in a meeting will hear the same audio and see the same visual data at all times. Interactions in the virtual conferencing platforms and video conferencing platforms are monolithic and disruptive by nature because any participation is always directed towards all attendees in the meeting. In current virtual conferencing platforms and video conferencing platforms, participants are incapable of seamlessly interacting with another specific participant (e.g., side-speaking between two participants) without disrupting the whole virtual gathering. Current virtual conferencing platforms and video conferencing platforms assume that all communication involves all participants, so these platforms provide a single audio channel for all attendees and the presenter. However, in some examples, two participants may want to share or highlight specific points during a precise moment of a presentation without distracting the attention from the presenter or disrupting the whole meeting.

Current virtual conferencing platforms and video conferencing platforms include parallel direct messaging (DM) texting systems to allow participants/attendees to communicate directly with another participant without disrupting the whole meeting. However, using a parallel DM texting system requires the receiving participant to be aware of such a parallel platform and to be willing to write during the meeting without being watched by other participants (e.g., the receiving participant cannot be sharing their display screen). Additionally, texting using a parallel DM texting system is usually slower and more prone to misunderstandings between the participants. Alternatively, a participant can disrupt the virtual conferencing meeting to ask the question or provide a comment or wait until the main speaker gives an opportunity for the audience to participate instead of trying to communicate (e.g., side speak) with another participant. However, disrupting a meeting for a question or comment directed to another participant may be considered rude and could alienate the other participants. In other examples, the participant can decide to simply not ask the question and obtain the answer from another source in the future. However, if a participant withholds his/her questions or comments, this could alienate the participant from the meeting, and communication in general is compromised if a participant is not able to present his/her inquiries and/or otherwise participate.

During in-person meetings, it is common for the participants to ask questions and provide comments in real time. These brief interactions are sometimes necessary for team members to solve quick questions that do not require interrupting the main speaker. However, virtual conferencing platforms and video conferencing platforms do not provide a direct personal option to address this, apart from DM texting communications in parallel. Examples disclosed herein enable a private audio-channel between two or more participants during virtual presentations to allow direct communication without interrupting the meeting (e.g., side speaking). Examples disclosed herein provide the private, secondary audio channel to play simultaneously with the main presentation audio in the primary audio channel of the video conferencing platform. From a receiving participant perspective, examples disclosed herein ensure the main presenting audio is made to appear as if it originates farther away while the audio of the participant in the secondary audio channel is made to appear as if it originates more closely (e.g., as if from a person on the side of the participate). The examples disclosed herein use binaural, 3D audio techniques.

Examples disclosed herein enable a private, secondary audio channel between two or more audience members/participants during video conferencing meetings. In examples disclosed herein, the secondary audio channel plays simultaneously with the primary audio channel that includes the main presentation audio, but the secondary audio channels play virtually at a different level and location from the primary audio channel. In examples disclosed herein, communication in the secondary audio channel is private, expeditious, seamless, and does not disrupt the main speaker of the primary audio channel. Examples disclosed herein provide a similar experience to a physical conference meeting where a person could talk/whisper to another person sitting next to them. Examples disclosed herein use binaural audio processing on the primary audio channel and the secondary audio channel to allow the participants in the secondary audio channel to hear each other as well as the main speaker of the primary audio channel at the same time. Examples disclosed herein use binaural audio processing to provide virtual positions of the audio included in the primary audio channel and the audio included in the secondary audio channel to allow a participant to easily distinguish between the two audio streams. In some examples herein, participants involved in the secondary audio channel use stereo headphones during the video conferencing meeting to enable the binaural audio processing. Examples disclosed herein allow a participant to select whether to join/engage in a secondary audio channel. In some examples disclosed herein, the secondary audio channel can include a plurality of participants (e.g., more than two). In some examples disclosed herein, the binaural audio processing is adjustable to include multiple positions for the audio in the secondary audio channel corresponding to the number of participants in the secondary audio channel.

Examples disclosed herein provide verbal communication between specific participants in a video conferencing meeting to allow fast, direct interaction without disruption to the remaining participants in the video conferencing meeting. Example disclosed herein provide a personal, effective, and efficient user experience for communicating directly with a participant in a video conferencing meeting rather than texting or other current, disruptive options. Examples disclosed herein enable a natural, presential-like interaction that helps participants of the virtual conferencing meetings communicate and stay engaged. Usage of binaural audio processing in examples disclosed herein allows a listener to prioritize and choose to whom to listen (e.g., between the main presenter of the primary audio channel or the fellow participant(s) of the secondary audio channel). In examples disclosed herein, the binaural audio processing enhances intelligibility and avoids interference between the different voices of the audio channels by reducing perceptual crosstalk even if the main speaker and fellow participant(s) are talking at the same time.

In some examples, examples disclosed herein can provide a report of attendee interaction levels for a video conferencing meeting. Examples disclosed herein can provide feedback to a presenter of the video conferencing meeting about key moments of the meeting that prompted increase attendance interactions (e.g., generating secondary audio channel(s) between participants for direct communication).

FIG. 1 is a schematic illustration of an example environment 100 in which teachings of this disclosure may be implemented. The example environment 100 includes an example user device 102 for participating in video conferencing meetings. The example user device 102 can be, for example, a smartphone, a personal computing (PC) device such as for example, a laptop, a desktop, an electronic tablet, a hybrid or convertible PC, etc., and/or other suitable devices. In some examples, the user device 102 includes example microphone(s) 104 and an example display screen 106. In examples disclosed herein, the display screen 106 is carried by a housing of the user device 102 and accessible via an exterior surface of the housing and, thus, can be considered an on-board user input device for the user device 102.

In some examples, the user device 102 additionally or alternatively includes external devices communicatively coupled to the user device 102, such as an example audio device 108. The example audio device 108 may be headphones, speakers, ear buds, etc. The example audio device 108 can be communicatively coupled to the user device 102 via one or more wired or wireless connections. The example user device 102 also includes an example processor 110 that executes software to interpret and output response(s) based on user input event(s) (e.g., touch event(s), keyboard input (s), mouse input(s) etc.) via the display screen 106 and/or via external device (e.g., a keyboard, a mouse, etc.).

In the illustrated example of FIG. 1, the processor 110 includes an example video conferencing circuitry 112 to execute software to participate in a video conferencing meeting with other user device(s). The video conferencing circuitry 112 manages a user's participation in a video conferencing meeting via the user device 102. The video conferencing circuitry 112 manages a primary audio channel from the video conferencing meeting and outputs the primary audio channel to the audio device 108. The video conferencing circuitry 112 also manages audio from the user of the user device 102 from the microphone(s) 104. The video conferencing circuitry 112 analyzes inputs from the user of the user device 102 related to the video conferencing meeting via the display screen 106 and/or via external device (e.g., a keyboard, a mouse, etc.). For example, the user of the user device 102 may make a selection to join or leave the video conferencing meeting and/or the user may make a selection to start or join a secondary audio channel with other participant(s) of the video conferencing meeting.

The video conferencing circuitry 112 generates private, secondary audio channel(s) between the user of the user device 102 and one or more participants during the video conferencing meeting in response to a user selection to join or start a secondary audio channel. The video conferencing circuitry 112 outputs the secondary audio channel to a participant simultaneously with the primary audio channel (e.g., the main presentation audio). The video conferencing circuitry 112 outputs the secondary audio channel(s) virtually at a different level and location from the primary audio channel. The video conferencing circuitry 112 uses binaural audio processing on the primary audio channel and the secondary audio channel(s) to allow the participants in the secondary audio channel(s) to hear each other as well as the main speaker of the primary audio channel at the same time. The video conferencing circuitry 112 uses binaural audio processing to provide virtual positions of the audio included in the primary audio channel and the audio included in the secondary audio channel(s) to allow a participant to easily distinguish between the two audio streams. In some examples, participants involved in the secondary audio channel(s) use an audio device (e.g., the audio device 108) during the video conferencing meeting to enable the binaural audio processing. The video conferencing circuitry 112 allows a participant to select whether to join/engage in a secondary audio channel (e.g., via the display screen 106). An example implementation of the example video conferencing circuitry 112 is disclosed below in conjunction with FIG. 2.

In the illustrated example of FIG. 1, the user device 102 communicates with example user device(s) 114 via the example network 116. In some examples, the network 116 can be the Internet or any other suitable external network. The user device(s) 114 can be, for example, smartphones and/or personal computing (PC) device(s) such as for example, a laptop, a desktop, an electronic tablet, a hybrid or convertible PC, etc. The user device 102 can transmit and receive data to and from an example processor 118 of the user device(s) 114. In examples disclosed herein, the user device 102 can transmit and receive audio data from the user device(s) 114 during a video conferencing meeting. In some examples, the user device(s) 114 correspond to other participants included in the video conferencing meeting. In some examples, the video conferencing circuitry 112 is also implemented by instructions executed on the processor 118 of the user device(s) 114. These components may be implemented in software, firmware, hardware, or in combination of two or more of software, firmware, and hardware.

Figure 2:
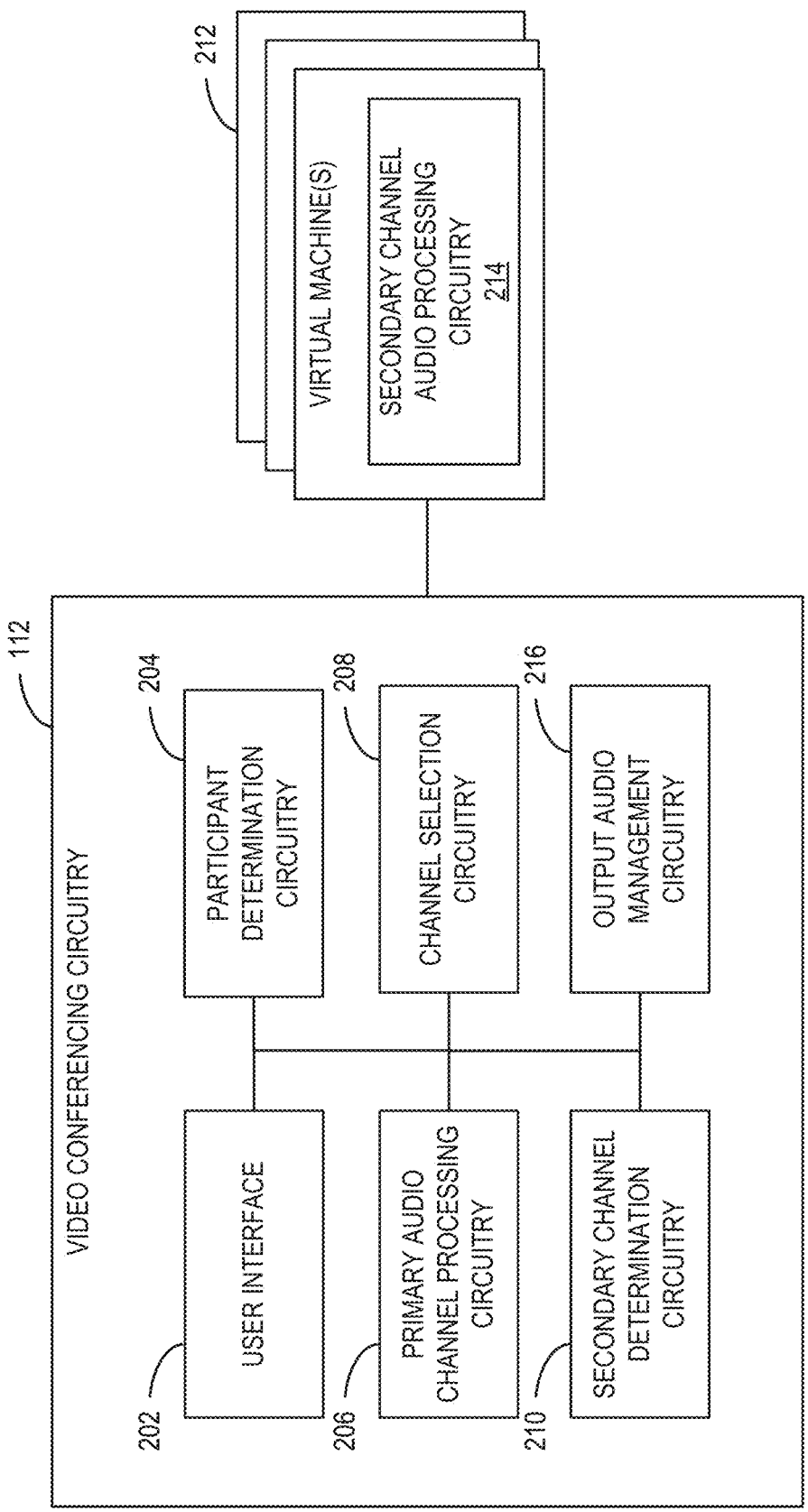
FIG. 2 is a block diagram of example video conferencing circuitry included in the example environment of FIG. 1.

FIG. 2 is a block diagram of the example video conferencing circuitry 112 included in the example environment 100 of FIG. 1. The example video conferencing circuitry 112 includes an example user interface 202, example participant determination circuitry 204, example primary audio channel processing circuitry 206, example channel selection circuitry 208, example secondary channel determination circuitry 210, example virtual machine(s) 212, example secondary channel audio processing circuitry 214, and example output audio management circuitry 216.

The user interface 202 obtains user selection data related to a video conferencing meeting from a user. In some examples, the user interface 202 obtains a selection from the user to join a video conferencing meeting. In some examples, the user interface 202 obtains the selection via a display screen (e.g., the display screen 106 of FIG. 1) and/or via an external device (e.g., a keyboard, a mouse, etc.) and/or via voice control (e.g., via a microphone). The user interface 202 displays visual data/information from the video conferencing meeting to the user via the display screen (e.g., the display screen 106 of FIG. 1). In some examples, the user interface 202 obtains a selection from the user to join or ignore secondary audio channel(s) in the video conferencing meeting. In response to the user interface 202 obtaining a selection from the user to join secondary audio channel(s), the user interface 202 displays an indication of joining the secondary audio channel(s) to the user via the display screen (e.g., the display screen 106 of FIG. 1).

In some examples, the video conferencing circuitry 112 includes means for displaying an indication. For example, the means for displaying may be implemented by user interface 202. In some examples, the user interface 202 may be implemented by machine executable instructions such as that implemented by at least blocks 502, 516 of FIG. 5 executed by processor circuitry, which may be implemented by the example processor circuitry 612 of FIG. 6, the example processor circuitry 700 of FIG. 7, and/or the example Field Programmable Gate Array (FPGA) circuitry 800 of FIG. 8. In other examples, the user interface 202 is implemented by other hardware logic circuitry, hardware implemented state machines, and/or any other combination of hardware, software, and/or firmware. For example, the user interface 202 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In the illustrated example, in response to the user interface 202 obtaining a selection to join a video conferencing meeting, the participant determination circuitry 204 determines a list of participants for the video conferencing meeting. In some examples, the participant determination circuitry 204 determines the list of participants based on information from the network 116 of FIG. 1. In some examples, the network 116 transmits data from other user devices (e.g., the user device(s) 114 of FIG. 1) that joined the video conferencing meeting. In some examples, the participant determination circuitry 204 receives identification information of the other user devices (e.g., the user device(s) 114) via the network 116 to determine the list of participants. In some examples, the participant determination circuitry 204 transmits the list of participants to the user interface 202 to display the list of participants to the user via a display screen (e.g., the display screen 106 of FIG. 1).

In some examples, the video conferencing circuitry 112 includes means for determining a list of participants. For example, the means for determining may be implemented by participant determination circuitry 204. In some examples, the participant determination circuitry 204 may be implemented by machine executable instructions such as that implemented by at least block 504 of FIG. 5 executed by processor circuitry, which may be implemented by the example processor circuitry 612 of FIG. 6, the example processor circuitry 700 of FIG. 7, and/or the example FPGA circuitry 800 of FIG. 8. In other examples, the participant determination circuitry 204 is implemented by other hardware logic circuitry, hardware implemented state machines, and/or any other combination of hardware, software, and/or firmware. For example, the participant determination circuitry 204 may be implemented by at least one or more hardware circuits (e.g., processor circuitry, discrete and/or integrated analog and/or digital circuitry, an FPGA, an ASIC, a comparator, an op-amp, a logic circuit, etc.) structured to perform the corresponding operation without executing software or firmware, but other structures are likewise appropriate.

In the illustrated example of FIG. 2, the primary audio channel processing circuitry 206 manages the audio data included in the primary audio channel of the video conferencing meeting. The primary audio channel processing circuitry 206 performs binaural audio processing on the primary audio channel of the video conferencing meeting. To perform the binaural audio processing, the primary audio channel processing circuitry 206 sets an angle for a position of the binaural audio for the primary audio channel. In some examples, the primary audio channel processing circuitry 206 sets the angle to be 90 degrees for the position to cause the binaural audio for the primary audio channel to appear to come from a front side of the user. The angle is relative to the user and the display screen 106. Thus, 90 degrees is directly in front of the user. This simulates that the user is in attendance and watching and listening to a presenter (on the primary audio channel) in front of them. However, the angle can be set to any value for the position of the binaural audio for the primary audio channel. The primary audio channel processing circuitry 206 performs binaural audio processing on the primary audio channel based on the angle set for the position. An example implementation of the binaural audio processing performed by the primary audio channel processing circuitry 206 is described in further detail below in connection with FIG. 3. The primary audio channel processing circuitry 206 outputs the binaural audio for the primary audio channel to the example output audio management circuitry 216.

In some examples, the video conferencing circuitry 112 includes means for generating binaural audio. For example, the means for generating may be implemented by the primary audio channel processing circuitry 206. In some examples, the primary audio channel processing circuitry 206 may be implemented by machine executable instructions such as that implemented by at least blocks 506, 508, 520, 524 of FIG. 5 executed by processor circuitry, which may be implemented by the example processor circuitry 612 of FIG. 6, the example processor circuitry 700 of FIG. 7, and/or the example FPGA circuitry 800 of FIG. 8. In other examples, the primary audio channel processing circuitry 206 is implemented by other hardware logic circuitry, hardware implemented state machines, and/or any other combination of hardware, software, and/or firmware. For example, the primary audio channel processing circuitry 206 may be implemented by at least one or more hardware circuits (e.g., processor circuitry, discrete and/or integrated analog and/or digital circuitry, an FPGA, an ASIC, a comparator, an op-amp, a logic circuit, etc.) structured to perform the corresponding operation without executing software or firmware, but other structures are likewise appropriate.

The channel selection circuitry 208 determines when to generate and/or join secondary audio channels based on the user inputs obtained by the user interface 202. In some examples, the channel selection circuitry 208 determines if there is a selection of participant(s) for secondary audio channel(s) from the list of participants determined by the participant determination circuitry 204. In some examples, the user interface 202 may obtain user selections through a display screen (e.g., the display screen 106 of FIG. 1) and/or via an external device (e.g., a keyboard, a mouse, etc.) and/or voice control (e.g., via a microphone) that indicate selection(s) of participant(s) from the list of participants displayed on the display screen. The channel selection circuitry 208 determines the user is starting a secondary audio channel based on the identification of a user selection of participant(s) from the list of participants.

In some examples, the channel selection circuitry 208 determines if a request is received to join a secondary audio channel. In some examples, the user interface 202 may receive a request from other participants in the video conferencing meeting via other user device(s) (e.g., the user device(s) 114 of FIG. 1). In such examples, the channel selection circuitry 208 determines if the user selection is to accept the request to join the secondary audio channel. The channel selection circuitry 208 determines if there is a user selection to accept the request based on the selection data received by the user interface 202. In examples disclosed herein, the channel selection circuitry 208 determines if the user has joined the secondary audio channel based on whether the user selects at least one participant from the list of participants in the video conferencing meeting to join a secondary audio channel, or the user selects to join the secondary audio channel based on accepting a request from a participant in the video conferencing meeting.

In some examples, the video conferencing circuitry 112 includes means for determining the user joined an audio channel. For example, the means for determining may be implemented by the channel selection circuitry 208. In some examples, the channel selection circuitry 208 may be implemented by machine executable instructions such as that implemented by at least blocks 510, 512, 514 of FIG. 5 executed by processor circuitry, which may be implemented by the example processor circuitry 612 of FIG. 6, the example processor circuitry 700 of FIG. 7, and/or the example FPGA circuitry 800 of FIG. 8. In other examples, the channel selection circuitry 208 is implemented by other hardware logic circuitry, hardware implemented state machines, and/or any other combination of hardware, software, and/or firmware. For example, the channel selection circuitry 208 may be implemented by at least one or more hardware circuits (e.g., processor circuitry, discrete and/or integrated analog and/or digital circuitry, an FPGA, an ASIC, a comparator, an op-amp, a logic circuit, etc.) structured to perform the corresponding operation without executing software or firmware, but other structures are likewise appropriate.

In some examples, if the channel selection circuitry 208 determines the user has joined the secondary audio channel, the primary audio channel processing circuitry 206 adjusts the angle for the position of the binaural audio from the primary audio channel. The primary audio channel processing circuitry 206 adjusts the position of the binaural audio for the primary audio channel to accommodate the positioning of the audio from the secondary audio channel. For example, the primary audio channel processing circuitry 206 may adjust the angle to 45 degrees for the position to cause the binaural audio for the primary audio channel to appear to come from a side of the user. However, the primary audio channel processing circuitry 206 can adjust the angle to any value for the position of the binaural audio for the primary audio channel. In such examples, the primary audio channel processing circuitry 206 performs binaural audio processing on the primary audio channel with the adjusted angle. The primary audio channel processing circuitry 206 outputs the adjusted binaural audio for the primary audio channel to the example output audio management circuitry 216.

In the illustrated example, the secondary channel determination circuitry 210 generates a secondary audio channel when the channel selection circuitry 208 determines the user has joined the secondary audio channel. The secondary channel determination circuitry 210 selects an angle for a position of the audio from secondary audio channel. In some examples, the secondary channel determination circuitry 210 selects a 45 degree angle to cause the audio for the secondary audio channel to appear to come from a side of the user while also accommodating the positioning of the audio from the primary audio channel. However, the secondary channel determination circuitry 210 can select any value for the angle for the position of the audio from the secondary audio channel as long as the value of the angle does not interfere with the adjusted angle for the position of the binaural audio for the primary audio channel. Thus, for example, when a user joins the secondary audio channel, the primary audio channel processing circuitry 206 adjusts the angle of the primary channel to 45 degrees to one side (a first side of the user), and the secondary channel determination circuitry 210 selects the angle for the secondary audio channel to 45 degrees to the other side (a second side of the user).

In some examples, the user joins multiple secondary audio channels with multiple participants (e.g., different participants on each of the secondary audio channels). The secondary channel determination circuitry 210 selects different respective angles for different ones of the secondary audio channels. Thus, with multiple secondary audio channels, the different participants virtually appear to be speaking from different locations. This simulates a real world setting where voices from different participants have different origination points.

In another example, the user joins a secondary audio channel with multiple participants on the same channel. In this example, the multiple participants are in a joint conversation on the same secondary audio channel. In this example, the secondary channel determination circuitry 210 selects a number of angles corresponding to the number of different audio data (i.e., participants) included in the secondary audio channel excluding the user. Thus, the secondary channel determination circuitry 210 selects different angles for different voices in the secondary audio channel. Thus, with multiple participants on the secondary audio channel, the different participants virtually appear to be speaking from different locations. This simulates a real world setting were voices from different participants have different origination points.

In some examples, the video conferencing circuitry 112 includes means for selecting an angle for an audio channel. For example, the means for selecting may be implemented by secondary channel determination circuitry 210. In some examples, the secondary channel determination circuitry 210 may be implemented by machine executable instructions such as that implemented by at least block 518 of FIG. 5 executed by processor circuitry, which may be implemented by the example processor circuitry 612 of FIG. 6, the example processor circuitry 700 of FIG. 7, and/or the example FPGA circuitry 800 of FIG. 8. In other examples, the secondary channel determination circuitry 210 is implemented by other hardware logic circuitry, hardware implemented state machines, and/or any other combination of hardware, software, and/or firmware. For example, the secondary channel determination circuitry 210 may be implemented by at least one or more hardware circuits (e.g., processor circuitry, discrete and/or integrated analog and/or digital circuitry, an FPGA, an ASIC, a comparator, an op-amp, a logic circuit, etc.) structured to perform the corresponding operation without executing software or firmware, but other structures are likewise appropriate.

In the illustrated example of FIG. 2, the secondary channel determination circuitry 210 employs the virtual machine(s) 212 to perform binaural audio processing on the secondary audio channel(s) simultaneously and in parallel to the primary audio channel processing circuitry 206 performing the binaural audio processing on the primary audio channel. The virtual machine(s) 212 allow the secondary audio channel to be virtually at a different level and location from the primary audio channel. In the illustrated example the virtual machine(s) 212 include the secondary channel audio processing circuitry 214. The secondary channel audio processing circuitry 214 performs the binaural audio processing on the secondary audio channel(s) with the selected angle(s) from the secondary channel determination circuitry 210. The secondary channel audio processing circuitry 214 outputs the binaural audio for the secondary audio channel(s) to the example output audio management circuitry 216. An example implementation of the binaural audio processing performed by the secondary channel audio processing circuitry 214 is disclosed in further detail below in connection with FIG. 3.

In some examples, the video conferencing circuitry 112 includes means for generating binaural audio. For example, the means for generating may be implemented by secondary channel audio processing circuitry 214. In some examples, the secondary channel audio processing circuitry 214 may be implemented by machine executable instructions such as that implemented by at least block 522 of FIG. 5 executed by processor circuitry, which may be implemented by the example processor circuitry 612 of FIG. 6, the example processor circuitry 700 of FIG. 7, and/or the example FPGA circuitry 800 of FIG. 8. In other examples, the secondary channel audio processing circuitry 214 is implemented by other hardware logic circuitry, hardware implemented state machines, and/or any other combination of hardware, software, and/or firmware. For example, the secondary channel audio processing circuitry 214 may be implemented by at least one or more hardware circuits (e.g., processor circuitry, discrete and/or integrated analog and/or digital circuitry, an FPGA, an ASIC, a comparator, an op-amp, a logic circuit, etc.) structured to perform the corresponding operation without executing software or firmware, but other structures are likewise appropriate.

In the illustrated example, the output audio management circuitry 216 receives the binaural audio for the primary audio channel from the primary audio channel processing circuitry 206. In some examples, when the secondary channel determination circuitry 210 generates a secondary audio channel, the output audio management circuitry 216 receives the binaural audio for the primary audio channel based on an adjusted angle from the primary audio channel processing circuitry 206, and the output audio management circuitry 216 receives the binaural audio for the secondary audio channel(s) based on the selected angle(s) from the secondary channel audio processing circuitry 214. In such examples, the output audio management circuitry 216 superimposes the binaural audio of the primary audio channel and the binaural audio of the secondary audio channel(s). In examples disclosed herein, the output audio management circuitry 216 outputs the binaural audio to the user via an audio device (e.g., the audio device 108).

In some examples, when the user joins a secondary audio channel, the user also communicates (e.g., via the example microphone(s) 104 of FIG. 1) in the secondary audio channel generated by the secondary channel determination circuitry 210 in response to the output binaural audio from the output audio management circuitry 216. In such examples, the user selects a channel to communicate in (e.g., the user selects the primary audio channel or the secondary audio channel). For example, if a user selects the secondary audio channel, then the output audio management circuitry 216 transmits (e.g., via the example network 116 of FIG. 1) the communication from the user (e.g., collected via the microphone(s) 104) to the participant(s) included in the secondary audio channel. In some examples, the channel selection circuitry 208 determines the selection of the audio channel from the user via the user interface 202 and transmits the user selection to the output audio management circuitry 216.

In some examples, when the user joins multiple secondary audio channels with multiple participants (e.g., different participants on each of the secondary audio channels), the user selects which of the audio channels (e.g., the primary audio channel or one of the multiple secondary audio channels) to communicate in (e.g., via the example microphone(s) 104) response to the output binaural audio from the output audio management circuitry 216. For example, if a user selects one of the multiple secondary audio channels, then the output audio management circuitry 216 transmits (e.g., via the example network 116) the communication from the user (e.g., collected via the microphone(s) 104) to the participant(s) included in the selected one of the multiple secondary audio channels. In such examples, the communication from the user is transmitted in the audio channel that is selected by the user (e.g., the participants in the audio channels not selected do not receive the communication from the user). In some examples, the channel selection circuitry 208 determines the selection of the audio channel from the user via the user interface 202 and transmits the user selection to the output audio management circuitry 216.

In some examples, the output audio management circuitry 216 tracks when the user is engaging with secondary audio channel(s) during the video conferencing meeting. In such examples, the output audio management circuitry 216 generates a report of the user interactions during the video conferencing meeting. In some examples, the output audio management circuitry 216 can provide the report of the user interactions to a presented of the video conferencing meeting (e.g., via the network 116 of FIG. 1) to enable a presenter to receive feedback about the key moments of the video conferencing meeting that prompted increased attendance interactions (e.g., via secondary audio channel(s)).

In some examples, the video conferencing circuitry 112 includes means for outputting audio. For example, the means for outputting may be implemented by output audio management circuitry 216. In some examples, the output audio management circuitry 216 may be implemented by machine executable instructions such as that implemented by at least blocks 526, 528 of FIG. 5 executed by processor circuitry, which may be implemented by the example processor circuitry 612 of FIG. 6, the example processor circuitry 700 of FIG. 7, and/or the example FPGA circuitry 800 of FIG. 8. In other examples, the output audio management circuitry 216 is implemented by other hardware logic circuitry, hardware implemented state machines, and/or any other combination of hardware, software, and/or firmware. For example, the output audio management circuitry 216 may be implemented by at least one or more hardware circuits (e.g., processor circuitry, discrete and/or integrated analog and/or digital circuitry, an FPGA, an ASIC, a comparator, an op-amp, a logic circuit, etc.) structured to perform the corresponding operation without executing software or firmware, but other structures are likewise appropriate.

Figure 3:
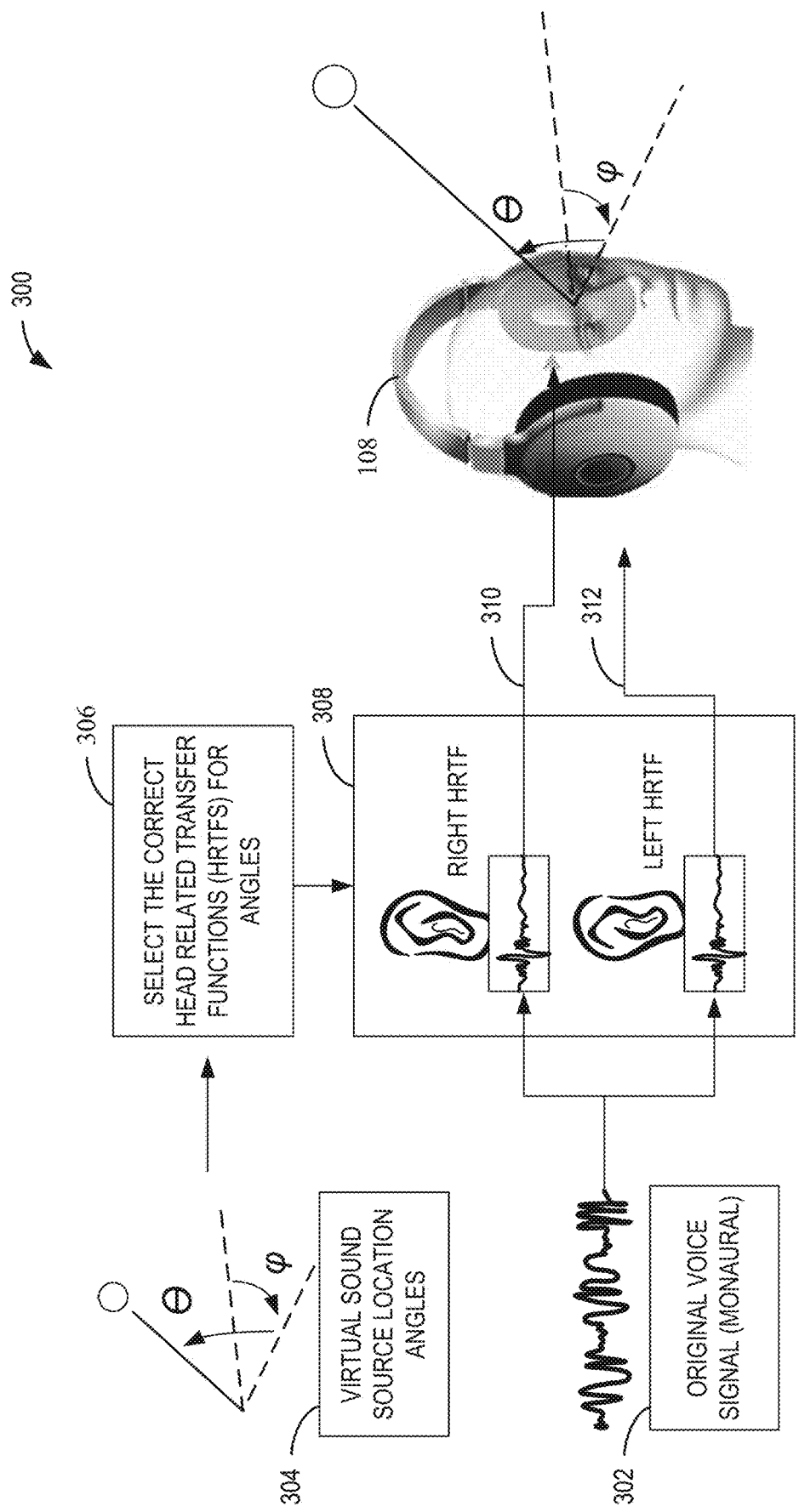
FIG. 3 is a schematic of example binaural audio processing in accordance with teachings of this disclosure.

FIG. 3 is a schematic of example binaural audio processing 300 in accordance with teachings of this disclosure. In examples disclosed herein, the primary audio channel processing circuitry 206 and the secondary channel audio processing circuitry 214 of FIG. 2 perform the binaural audio processing illustrated in FIG. 3. In the illustrated example, the binaural audio processing 300 begins with receiving an input audio signal 302. In some examples, the input audio signal 302 can be audio from a primary audio channel received by the primary audio channel processing circuitry 206. In other examples, the input audio signal 302 can be audio from a secondary audio channel received by the secondary channel audio processing circuitry 214. The binaural audio processing 300 also includes receiving an input angle 304. In some examples, the input angle 304 can be an angle selected for the primary audio channel or an adjusted angle for the primary audio channel. In other examples, the input angle 304 can be a selected angle for the secondary audio channel.

In the binaural audio processing 300 for a primary audio channel, the primary audio channel processing circuitry 206 selects the head related transfer functions (HRTFs) 306 that correspond to the input angle 304. In the binaural audio processing 300 for a secondary audio channel, the secondary channel audio processing circuitry 214 selects the HRTFs 306 that correspond to the input angle 304. In the illustrated example, the binaural audio processing 300 processing the input audio signal 302 with digital filters (e.g., the HRTFs 306) to generate realistic, 3D sounding perception of the audio from the primary audio channel and of the audio from the secondary audio channel. The primary audio channel processing circuitry 206 and the secondary channel audio processing circuitry 214 select the respective HRTFs 306 depending on the direction selected for the audio (e.g., the audio from the primary audio channel and the audio from the secondary audio channel) set by the input angle 304. The binaural audio processing 300 continues to perform digital filtering 308 the input audio signal 302 using the selected HRTFs 306. In the illustrated example, the primary audio channel processing circuitry 206 and the secondary channel audio processing circuitry 214 select different right HRTFs for sound arriving at the right ear and left HRTFs for sound arriving at the left ear based on the input angle 304. In the illustrated example of FIG. 3, the binaural audio processing 300 outputs a right side audio signal 310 and a left side audio signal 312 based on the digital filtering 308. The right side audio signal 310 corresponds to the audio signals output on a right side of the audio device 108 of FIG. 1, and the left side audio signal 312 corresponds to the audio signal output on a left side of the audio device 108. In the illustrated example, the primary audio channel processing circuitry 206 obtains a first left side audio signal and a first right side audio signal, and the secondary channel audio processing circuitry 214 obtains a second left side audio signal and a second right side audio signal. In examples disclosed herein, the output audio management circuitry 216 superimposes the left side audio signals and the right side audio signals from the primary audio channel processing circuitry 206 and the secondary channel audio processing circuitry 214 before outputting to the audio device 108.

Figure 4:
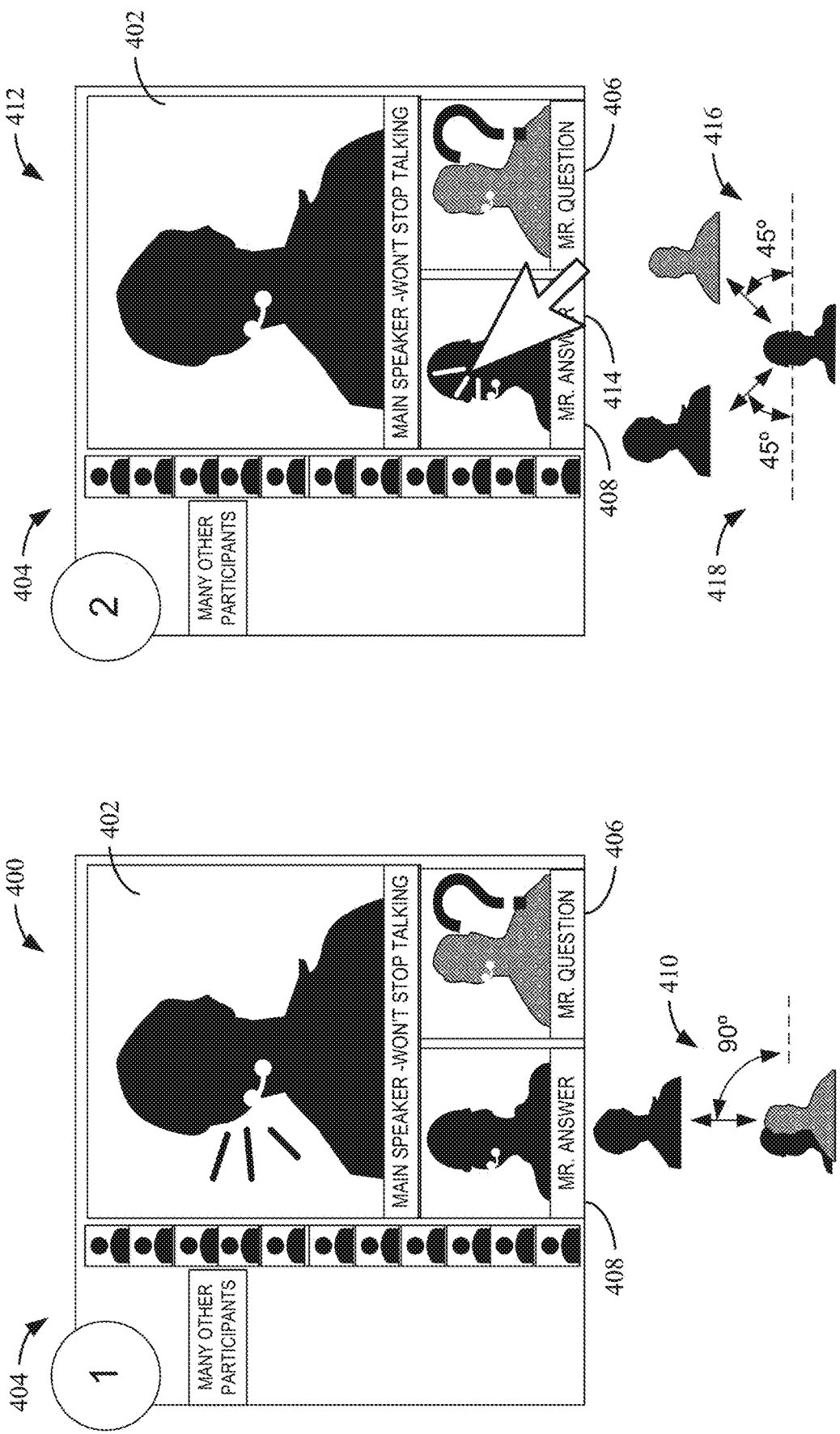
FIGS. 4A, 4B are schematics of displays from the example video conferencing circuitry of FIGS. 1 and/or 2.

FIGS. 4A, 4B are schematics of displays 400, 412 from the example video conferencing circuitry 112 of FIGS. 1 and/or 2. In the illustrated example of FIG. 4A, the example display 400 illustrates an example of a display screen (e.g., the display screen 106 of FIG. 1) that includes an illustration of a virtual conferencing meeting in accordance with the teachings of this disclosure. The example display 400 includes a main presenter 402 that is displayed larger than the rest of the information in the display 400. The example display 400 also includes a list of participants 404 in the virtual conferencing meeting determined by the example participant determination circuitry 204 of FIG. 2.

In the illustrated example of FIG. 4A, a user 406 is displayed on the display screen 106 along with an additional participant 408. In the illustrated example, the user 406, the additional participant 408, and the rest of the participants included in the list of participants 404 are focused on listening to the primary audio channel of the main presenter 402. In the illustrated example, the main presenter 402 is heard as being in front of all of the participants (including the user 406). In such an example, the primary audio channel processing circuitry 206 sets the angle of the position of the primary audio channel as 90 degrees to allow the audio from the primary audio channel to appear to come from in front of the participants in the virtual conferencing meeting. However, in the illustrated example, the user 406 wants to ask a question to the additional participant 408 regarding the presentation from the main presenter 402 instead of disrupting the virtual conferencing meeting to ask the main presenter 402.

In the illustrated example of FIG. 4B, the example display 412 illustrates an example of a display screen (e.g., the display screen 106 of FIG. 1) that includes an illustration of a virtual conferencing meeting with a secondary audio channel in accordance with the teachings of this disclosure. In the illustrated example, a user selection 414 is completed by the user 406 (e.g., via the user interface 202 of FIG. 2) to select the additional participant 408 to start a secondary audio channel. In some examples, the user 406 selects the additional participant 408 to start a secondary audio channel via a gesture, a keyboard input, a mouse command, a voice command, etc. In examples disclosed herein, the additional participant 408 selects to join the second audio channel started by the user 406.

After the secondary audio channel is started, the secondary channel determination circuitry 210 selects an angle 416 for the position of the audio of the secondary audio channel, and the primary audio channel processing circuitry 206 adjusts an angle 418 for the position of the audio of the primary audio channel. In the illustrated example, the secondary channel determination circuitry 210 selects the angle 416 to be 45 degrees (measured from the right side of the participant 408) and the primary audio channel processing circuitry 206 adjust the angle 418 to be 45 degrees (measured from the left side of the participant 408). In other examples, other angles may be used. In the illustrated example, the secondary channel audio processing circuitry 214 performs binaural audio processing on the audio of the secondary audio channel using the angle 416, and the primary audio channel processing circuitry 206 performs binaural audio processing on the audio of the primary audio channel using the angle 418. In the illustrated example of FIG. 4B, the audio from the secondary audio channel between the user 406 and the additional participant 408 and the audio from the primary audio channel of the presentation from the main presenter 402 appear to come either side of the user 406 and the additional participant 408. The virtual positioning of the audio from the secondary audio channel and the audio from the primary audio channel through binaural audio processing allows for the user 406 and the additional participant 408 to listen and decide to pay attention to either the audio from the primary audio channel or the audio from the secondary audio channel (or both). In the illustrated example of FIG. 4B, the user 406 and the additional participant 408 are able to participate in a side conversation without interrupting the presentation of the main presenter 402.

While an example manner of implementing the example video conferencing circuitry 112 of FIG. 1 is illustrated in FIG. 2, one or more of the elements, processes, and/or devices illustrated in FIG. 2 may be combined, divided, re-arranged, omitted, eliminated, and/or implemented in any other way. Further, the example user interface 202, the example participant determination circuitry 204, the example primary audio channel processing circuitry 206, the example channel selection circuitry 208, the example secondary channel determination circuitry 210, the example virtual machine(s) 212, the example secondary channel audio processing circuitry 214, the example output audio management circuitry 216 and/or, more generally, the example video conferencing circuitry 112 of FIG. 1, may be implemented by hardware alone or by hardware in combination with software and/or firmware. Thus, for example, any of the example user interface 202, the example participant determination circuitry 204, the example primary audio channel processing circuitry 206, the example channel selection circuitry 208, the example secondary channel determination circuitry 210, the example virtual machine(s) 212, the example secondary channel audio processing circuitry 214, the example output audio management circuitry 216 and/or, more generally, the example video conferencing circuitry 112, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example video conferencing circuitry 112 of FIG. 1 may include one or more elements, processes, and/or devices in addition to, or instead of, those illustrated in FIG. 2, and/or may include more than one of any or all of the illustrated elements, processes and devices.

Figure 5:
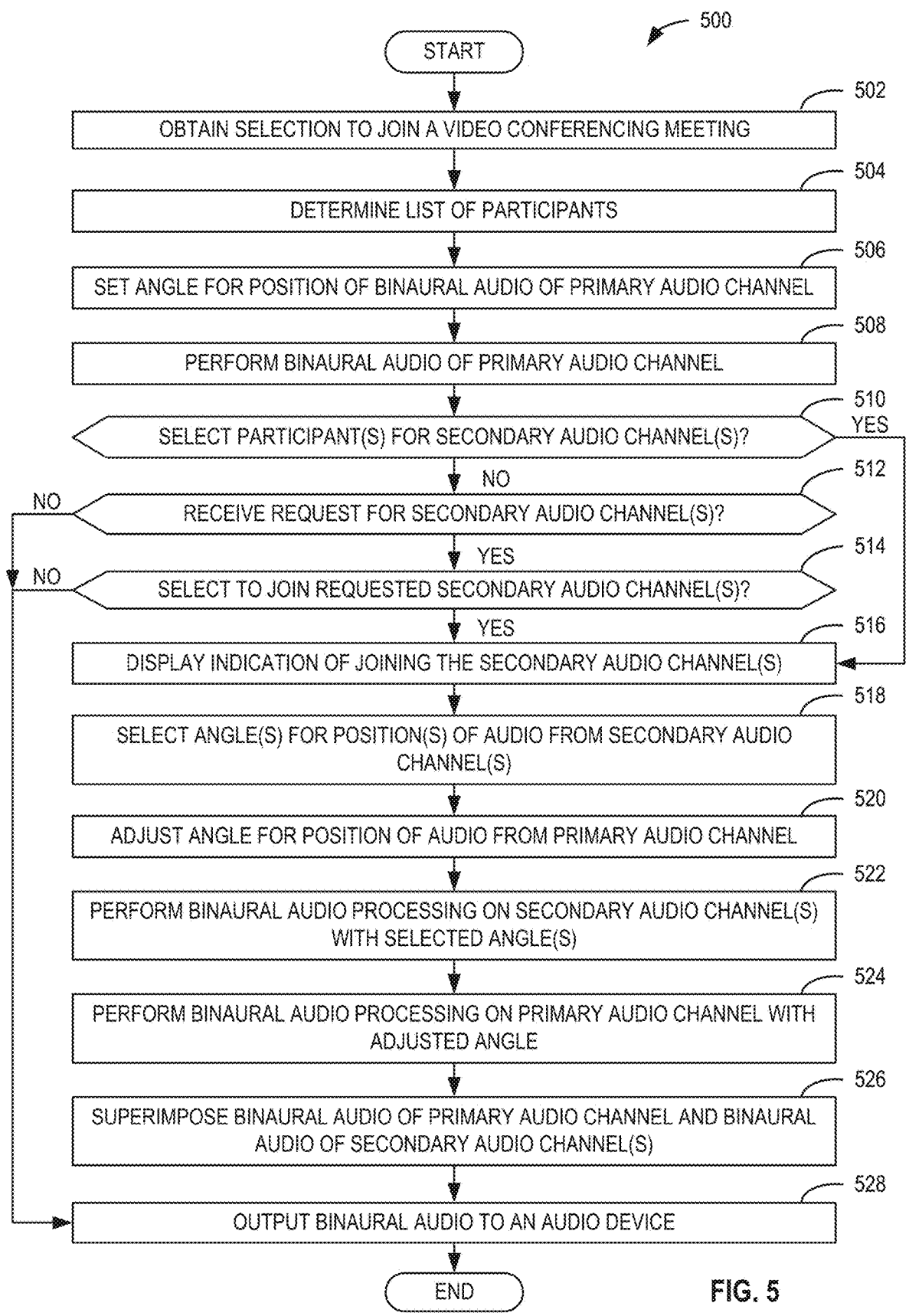
FIG. 5 is a flowchart representative of example machine readable instructions that may be executed by example processor circuitry to implement the example video conferencing circuitry of FIGS. 1 and/or 2.

A flowchart representative of example hardware logic circuitry, machine readable instructions, hardware implemented state machines, and/or any combination thereof for implementing the example video conferencing circuitry 112 of FIG. 2 is shown in FIG. 5. The machine readable instructions may be one or more executable programs or portion(s) of an executable program for execution by processor circuitry, such as the processor circuitry 612 shown in the example processor platform 600 discussed below in connection with FIG. 6 and/or the example processor circuitry discussed below in connection with FIGS. 7 and/or 8. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 5, many other methods of implementing the example video conferencing circuitry 112 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIG. 5 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 5 is a flowchart representative of example machine readable instructions and/or example operations 500 that may be executed and/or instantiated by processor circuitry to implement the example video conferencing circuitry 112 of FIGS. 1 and/or 2. The machine readable instructions and/or operations 500 of FIG. 5 begin at block 502, at which the example user interface 202 of FIG. 2 obtains a selection to join a video conferencing meeting. In some examples, the user interface 202 obtains a selection from the user to join a video conferencing meeting. In some examples, the user interface 202 obtains the selection via a display screen (e.g., the display screen 106 of FIG. 1), a microphone, and/or via an external device (e.g., a keyboard, a mouse, etc.).

At block 504, the example participant determination circuitry 204 of FIG. 2 determines a list of participants. In some examples, the participant determination circuitry 204 determines the list of participants based on information from the network 116 of FIG. 1. In some examples, the network 116 transmits data from other user devices (e.g., the user device(s) 114 of FIG. 1) that joined the video conferencing meeting. In some examples, the participant determination circuitry 204 receives identification information of the other user devices (e.g., the user device(s) 114) via the network 116 to determine the list of participants. In some examples, the participant determination circuitry 204 transmits the list of participants to the user interface 202 to display the list of participants to the user via a display screen (e.g., the display screen 106 of FIG. 1).

At block 506, the example primary audio channel processing circuitry 206 of FIG. 2 sets an angle for a position of binaural audio of a primary audio channel. In some examples, the primary audio channel processing circuitry 206 sets the angle to be 90 degrees for the position to cause the binaural audio for the primary audio channel to appear to come from a front side of the user. However, the angle can be set to any value for the position of the binaural audio for the primary audio channel. At block 508, the example primary audio channel processing circuitry 206 performs binaural audio of the primary audio channel. The primary audio channel processing circuitry 206 performs binaural audio processing on the primary audio channel based on the angle set for the position.

At block 510, the example channel selection circuitry 208 of FIG. 2 determines if there is a selection of participant(s) for secondary audio channel(s). In some examples, the channel selection circuitry 208 determines if there is a selection of participant(s) for secondary audio channel(s) from the list of participants determined by the participant determination circuitry 204. In some examples, the user interface 202 may obtain user selections through a display screen (e.g., the display screen 106 of FIG. 1), a microphone, and/or via an external device (e.g., a keyboard, a mouse, etc.) that indicate selection(s) of participant(s) from the list of participants displayed on the display screen. If the example channel selection circuitry 208 determines there is a selection of participant(s) for secondary audio channel(s), the process 500 continues to block 516 at which the example user interface 202 displays an indication of joining the secondary audio channel(s).

If the example channel selection circuitry 208 determines there is not a selection of participant(s) for secondary audio channel(s), the process 500 continues to block 512 at which the example channel selection circuitry 208 determines if a request is received for the user to join secondary audio channel(s). In some examples, the user interface 202 may receive a request from other participants in the video conferencing meeting via other user device(s) (e.g., the user device(s) 114 of FIG. 1). If the example channel selection circuitry 208 determines a request is not received for secondary audio channel(s), the process 500 continues to block 528 at which the example output audio management circuitry 216 of FIG. 2 outputs the binaural audio to an audio device (e.g., the audio device 108).

If the example channel selection circuitry 208 determines a request is received for secondary audio channel(s), the process 500 continues to block 514 at which the example channel selection circuitry 208 determines if there is a selection to join the requested secondary audio channel(s). The channel selection circuitry 208 determines if there is a user selection to accept the request based on the selection data received by the user interface 202. If the example channel selection circuitry 208 determines there is not a selection to join requested secondary audio channel(s), the process 500 continues to block 528 at which the example output audio management circuitry 216 outputs the binaural audio to an audio device (e.g., the audio device 108). If the example channel selection circuitry 208 determines there is a selection to join requested secondary audio channel(s), the process 500 continues to block 516 at which the example user interface 202 displays an indication of joining the secondary audio channel(s).

At block 518, the example secondary channel determination circuitry 210 of FIG. 2 selects angle(s) for position(s) of audio from secondary audio channel(s). In some examples, the secondary channel determination circuitry 210 selects an angle for a position of the audio from secondary audio channel. In some examples, the secondary channel determination circuitry 210 selects a 45 degree angle to cause the audio for the secondary audio channel to appear to come from a side of the user while also accommodating the positioning of the audio from the primary audio channel. However, the secondary channel determination circuitry 210 can select any value for the angle for the position of the audio from the secondary audio channel as long as the value of the angle does not interfere with the adjusted angle for the position of the binaural audio for the primary audio channel. In some examples, the user joins multiple secondary audio channels with multiple participants (e.g., different participants on each of the secondary audio channels). The secondary channel determination circuitry 210 selects different respective angles for different ones of the secondary audio channels that do not interfere with each of the other secondary audio channels and do not interfere with the angle of the primary audio channel. In another example, the user joins a secondary audio channel with multiple participants on the same channel. In this example, the multiple participants are in a joint conversation on the same secondary audio channel. In this example, the secondary channel determination circuitry 210 selects a number of angles corresponding to the number of different audio data (i.e., participants) included in the secondary audio channel excluding the user. Thus, the secondary channel determination circuitry 210 selects different angles for different voices in the secondary audio channel that do not interfere with each of the other voices in the secondary audio channel and do not interfere with the primary audio channel.

At block 520, the example primary audio channel processing circuitry 206 adjusts the angle for position of audio from the primary audio channel. In some examples, if the channel selection circuitry 208 determines the user has joined the secondary audio channel, the primary audio channel processing circuitry 206 adjusts the angle for the position of the binaural audio from the primary audio channel. The primary audio channel processing circuitry 206 adjusts the position of the binaural audio for the primary audio channel to accommodate the positioning of the audio from the secondary audio channel. For example, the primary audio channel processing circuitry 206 may adjust the angle to 45 degrees for the position to cause the binaural audio for the primary audio channel to appear to come from a side of the user. However, the primary audio channel processing circuitry 206 can adjust the angle to any value for the position of the binaural audio for the primary audio channel. In some examples, the primary audio channel processing circuitry 206 does not adjust the angle for the primary channel, and the angle for the secondary audio channel(s) is selected to avoid interference with the angle of the primary channel.

At block 522, the example secondary channel audio processing circuitry 214 performs binaural audio processing on secondary audio channel(s) with selected angle(s). The secondary channel audio processing circuitry 214 outputs the binaural audio for the secondary audio channel(s) to the example output audio management circuitry 216. At block 524, the example primary audio channel processing circuitry 206 performs binaural audio processing on primary audio channel with the adjusted angle. The primary audio channel processing circuitry 206 outputs the adjusted binaural audio for the primary audio channel to the example output audio management circuitry 216. At block 526, the example output audio management circuitry 216 superimposes the binaural audio of the primary audio channel and the binaural audio of the secondary audio channel(s). At block 528, the example output audio management circuitry 216 outputs the binaural audio to an audio device (e.g., the audio device 108). After block 528, process 500 ends.

Figure 6:
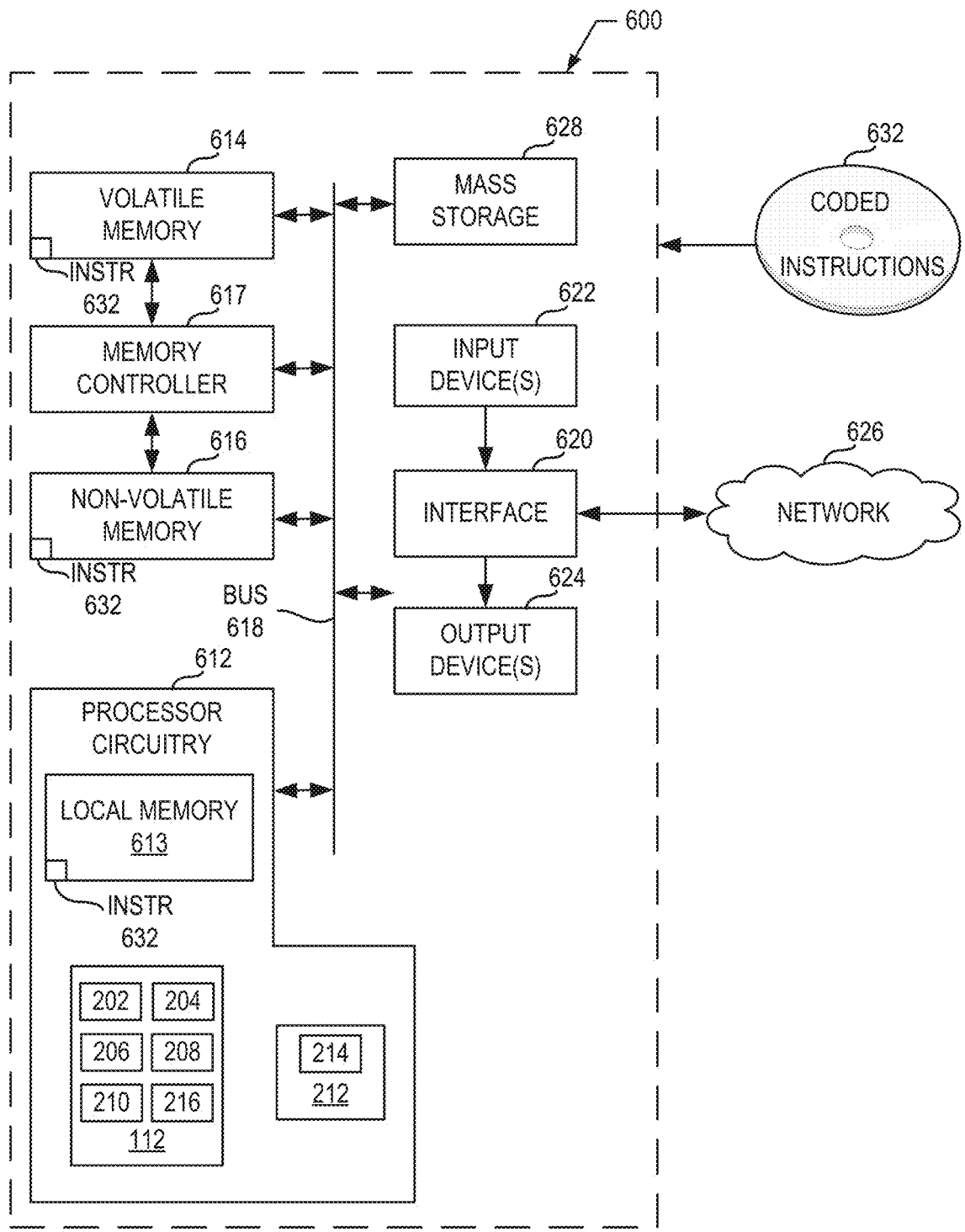
FIG. 6 is a block diagram of an example processing platform including processor circuitry structured to execute the example machine readable instructions of FIG. 5 to implement the example video conferencing circuitry of FIGS. 1 and/or 2.

FIG. 6 is a block diagram of an example processor platform 600 structured to execute and/or instantiate the machine readable instructions and/or operations of FIG. 5 to implement the example video conferencing circuitry 112 of FIGS. 1 and/or 2. The processor platform 600 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 600 of the illustrated example includes processor circuitry 612. The processor circuitry 612 of the illustrated example is hardware. For example, the processor circuitry 612 can be implemented by one or more integrated circuits, logic circuits, FPGAs microprocessors, CPUs, GPUs, DSPs, and/or microcontrollers from any desired family or manufacturer. The processor circuitry 612 may be implemented by one or more semiconductor based (e.g., silicon based) devices. In this example, the processor circuitry 612 implements user interface 202, the example participant determination circuitry 204, the example primary audio channel processing circuitry 206, the example channel selection circuitry 208, the example secondary channel determination circuitry 210, the example virtual machine(s) 212, the example secondary channel audio processing circuitry 214, and the example output audio management circuitry 216.

The processor circuitry 612 of the illustrated example includes a local memory 613 (e.g., a cache, registers, etc.). The processor circuitry 612 of the illustrated example is in communication with a main memory including a volatile memory 614 and a non-volatile memory 616 by a bus 618. The volatile memory 614 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 616 may be implemented by flash memory and/or any other desired type of memory device. Access to the main memory 614, 616 of the illustrated example is controlled by a memory controller 617.

The processor platform 600 of the illustrated example also includes interface circuitry 620. The interface circuitry 620 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 622 are connected to the interface circuitry 620. The input device(s) 622 permit(s) a user to enter data and/or commands into the processor circuitry 612. The input device(s) 622 can be implemented by, for example, an audio sensor, a microphone, a camera (still or video), a keyboard, a button, a mouse, a touchscreen, a track-pad, a trackball, an isopoint device, and/or a voice recognition system.

One or more output devices 624 are also connected to the interface circuitry 620 of the illustrated example. The output devices 624 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 620 of the illustrated example, thus, typically includes a graphics driver card, a graphics driver chip, and/or graphics processor circuitry such as a GPU.

The interface circuitry 620 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 626. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 600 of the illustrated example also includes one or more mass storage devices 628 to store software and/or data. Examples of such mass storage devices 628 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 632, which may be implemented by the machine readable instructions of FIG. 5, may be stored in the mass storage device 628, in the volatile memory 614, in the non-volatile memory 616, and/or on a removable non-transitory computer readable storage medium such as a CD or DVD.

Figure 7:
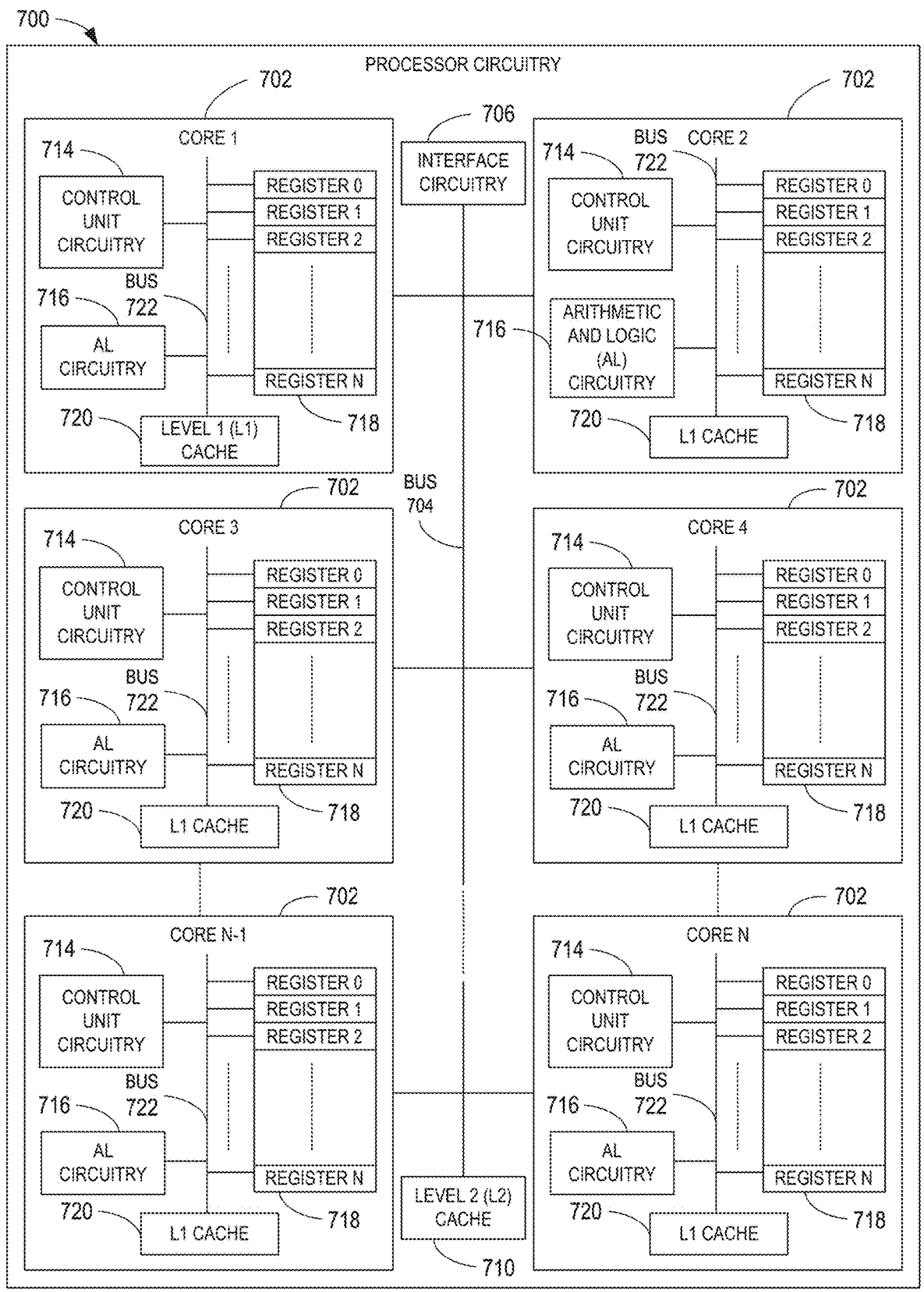
FIG. 7 is a block diagram of an example implementation of the processor circuitry of FIG. 6.

FIG. 7 is a block diagram of an example implementation of the processor circuitry 612 of FIG. 6. In this example, the processor circuitry 612 of FIG. 6 is implemented by a microprocessor 700. For example, the microprocessor 700 may implement multi-core hardware circuitry such as a CPU, a DSP, a GPU, an XPU, etc. Although it may include any number of example cores 702 (e.g., 1 core), the microprocessor 700 of this example is a multi-core semiconductor device including N cores. The cores 702 of the microprocessor 700 may operate independently or may cooperate to execute machine readable instructions. For example, machine code corresponding to a firmware program, an embedded software program, or a software program may be executed by one of the cores 702 or may be executed by multiple ones of the cores 702 at the same or different times. In some examples, the machine code corresponding to the firmware program, the embedded software program, or the software program is split into threads and executed in parallel by two or more of the cores 702. The software program may correspond to a portion or all of the machine readable instructions and/or operations represented by the flowchart of FIG. 5.

The cores 702 may communicate by an example bus 704. In some examples, the bus 704 may implement a communication bus to effectuate communication associated with one(s) of the cores 702. For example, the bus 704 may implement at least one of an Inter-Integrated Circuit (I2C) bus, a Serial Peripheral Interface (SPI) bus, a PCI bus, or a PCIe bus. Additionally or alternatively, the bus 704 may implement any other type of computing or electrical bus. The cores 702 may obtain data, instructions, and/or signals from one or more external devices by example interface circuitry 706. The cores 702 may output data, instructions, and/or signals to the one or more external devices by the interface circuitry 706. Although the cores 702 of this example include example local memory 720 (e.g., Level 1 (L1) cache that may be split into an L1 data cache and an L1 instruction cache), the microprocessor 700 also includes example shared memory 710 that may be shared by the cores (e.g., Level 2 (L2_cache)) for high-speed access to data and/or instructions. Data and/or instructions may be transferred (e.g., shared) by writing to and/or reading from the shared memory 710. The local memory 720 of each of the cores 702 and the shared memory 710 may be part of a hierarchy of storage devices including multiple levels of cache memory and the main memory (e.g., the main memory 614, 616 of FIG. 6). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 702 may be referred to as a CPU, DSP, GPU, etc., or any other type of hardware circuitry. Each core 702 includes control unit circuitry 714, arithmetic and logic (AL) circuitry (sometimes referred to as an ALU) 716, a plurality of registers 718, the L1 cache 720, and an example bus 722. Other structures may be present. For example, each core 702 may include vector unit circuitry, single instruction multiple data (SIMD) unit circuitry, load/store unit (LSU) circuitry, branch/jump unit circuitry, floating-point unit (FPU) circuitry, etc. The control unit circuitry 714 includes semiconductor-based circuits structured to control (e.g., coordinate) data movement within the corresponding core 702. The AL circuitry 716 includes semiconductor-based circuits structured to perform one or more mathematic and/or logic operations on the data within the corresponding core 702. The AL circuitry 716 of some examples performs integer based operations. In other examples, the AL circuitry 716 also performs floating point operations. In yet other examples, the AL circuitry 716 may include first AL circuitry that performs integer based operations and second AL circuitry that performs floating point operations. In some examples, the AL circuitry 716 may be referred to as an Arithmetic Logic Unit (ALU). The registers 718 are semiconductor-based structures to store data and/or instructions such as results of one or more of the operations performed by the AL circuitry 716 of the corresponding core 702. For example, the registers 718 may include vector register(s), SIMD register(s), general purpose register(s), flag register(s), segment register(s), machine specific register(s), instruction pointer register(s), control register(s), debug register(s), memory management register(s), machine check register(s), etc. The registers 718 may be arranged in a bank as shown in FIG. 7. Alternatively, the registers 718 may be organized in any other arrangement, format, or structure including distributed throughout the core 702 to shorten access time. The bus 720 may implement at least one of an I2C bus, a SPI bus, a PCI bus, or a PCIe bus Each core 702 and/or, more generally, the microprocessor 700 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 700 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 8:
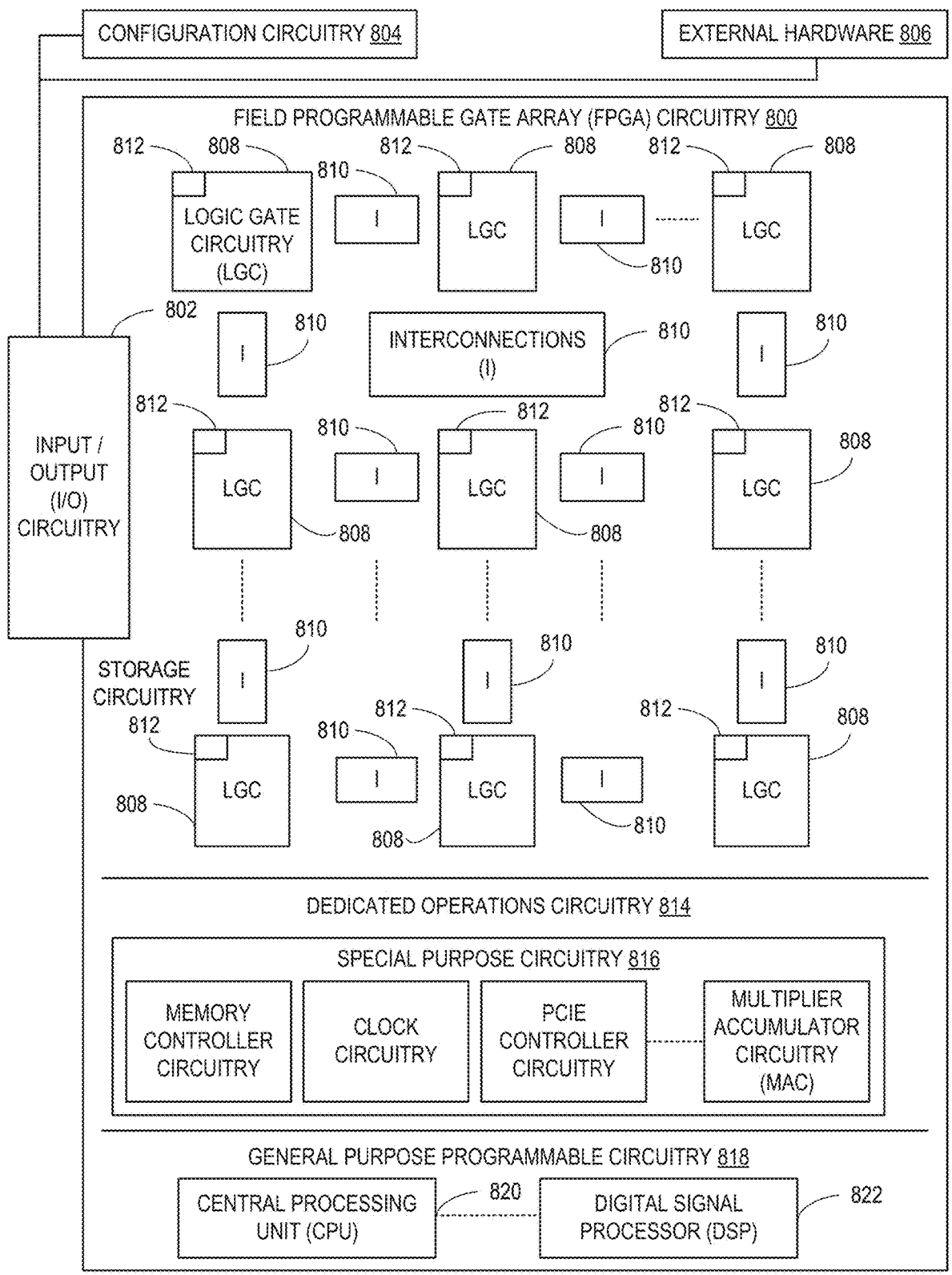
FIG. 8 is a block diagram of another example implementation of the processor circuitry of FIG. 6.

FIG. 8 is a block diagram of another example implementation of the processor circuitry 612 of FIG. 6. In this example, the processor circuitry 612 is implemented by FPGA circuitry 800. The FPGA circuitry 800 can be used, for example, to perform operations that could otherwise be performed by the example microprocessor 700 of FIG. 7 executing corresponding machine readable instructions. However, once configured, the FPGA circuitry 800 instantiates the machine readable instructions in hardware and, thus, can often execute the operations faster than they could be performed by a general purpose microprocessor executing the corresponding software.

More specifically, in contrast to the microprocessor 700 of FIG. 7 described above (which is a general purpose device that may be programmed to execute some or all of the machine readable instructions represented by the flowchart of FIG. 5 but whose interconnections and logic circuitry are fixed once fabricated), the FPGA circuitry 800 of the example of FIG. 8 includes interconnections and logic circuitry that may be configured and/or interconnected in different ways after fabrication to instantiate, for example, some or all of the machine readable instructions represented by the flowchart of FIG. 5. In particular, the FPGA 800 may be thought of as an array of logic gates, interconnections, and switches. The switches can be programmed to change how the logic gates are interconnected by the interconnections, effectively forming one or more dedicated logic circuits (unless and until the FPGA circuitry 800 is reprogrammed). The configured logic circuits enable the logic gates to cooperate in different ways to perform different operations on data received by input circuitry. Those operations may correspond to some or all of the software represented by the flowchart of FIG. 5. As such, the FPGA circuitry 800 may be structured to effectively instantiate some or all of the machine readable instructions of the flowchart of FIG. 5 as dedicated logic circuits to perform the operations corresponding to those software instructions in a dedicated manner analogous to an ASIC. Therefore, the FPGA circuitry 800 may perform the operations corresponding to the some or all of the machine readable instructions of FIG. 5 faster than the general purpose microprocessor can execute the same.

In the example of FIG. 8, the FPGA circuitry 800 is structured to be programmed (and/or reprogrammed one or more times) by an end user by a hardware description language (HDL) such as Verilog. The FPGA circuitry 800 of FIG. 8, includes example input/output (I/O) circuitry 802 to obtain and/or output data to/from example configuration circuitry 804 and/or external hardware (e.g., external hardware circuitry) 806. For example, the configuration circuitry 804 may implement interface circuitry that may obtain machine readable instructions to configure the FPGA circuitry 800, or portion(s) thereof. In some such examples, the configuration circuitry 804 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 806 may implement the microprocessor 700 of FIG. 7. The FPGA circuitry 800 also includes an array of example logic gate circuitry 808, a plurality of example configurable interconnections 810, and example storage circuitry 812. The logic gate circuitry 808 and interconnections 810 are configurable to instantiate one or more operations that may correspond to at least some of the machine readable instructions of FIG. 5 and/or other desired operations. The logic gate circuitry 808 shown in FIG. 8 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 808 to enable configuration of the electrical structures and/or the logic gates to form circuits to perform desired operations. The logic gate circuitry 808 may include other electrical structures such as look-up tables (LUTs), registers (e.g., flip-flops or latches), multiplexers, etc.

The interconnections 810 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 808 to program desired logic circuits.

The storage circuitry 812 of the illustrated example is structured to store result(s) of the one or more of the operations performed by corresponding logic gates. The storage circuitry 812 may be implemented by registers or the like. In the illustrated example, the storage circuitry 812 is distributed amongst the logic gate circuitry 808 to facilitate access and increase execution speed.

The example FPGA circuitry 800 of FIG. 8 also includes example Dedicated Operations Circuitry 814. In this example, the Dedicated Operations Circuitry 814 includes special purpose circuitry 816 that may be invoked to implement commonly used functions to avoid the need to program those functions in the field. Examples of such special purpose circuitry 816 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 800 may also include example general purpose programmable circuitry 818 such as an example CPU 820 and/or an example DSP 822. Other general purpose programmable circuitry 818 may additionally or alternatively be present such as a GPU, an XPU, etc., that can be programmed to perform other operations.

Although FIGS. 7 and 8 illustrate two example implementations of the processor circuitry 612 of FIG. 6, many other approaches are contemplated. For example, as mentioned above, modern FPGA circuitry may include an on-board CPU, such as one or more of the example CPU 820 of FIG. 8. Therefore, the processor circuitry 612 of FIG. 6 may additionally be implemented by combining the example microprocessor 700 of FIG. 7 and the example FPGA circuitry 800 of FIG. 8. In some such hybrid examples, a first portion of the machine readable instructions represented by the flowchart of FIG. 5 may be executed by one or more of the cores 702 of FIG. 7 and a second portion of the machine readable instructions represented by the flowchart of FIG. 5 may be executed by the FPGA circuitry 800 of FIG. 8.

In some examples, the processor circuitry 612 of FIG. 6 may be in one or more packages. For example, the processor circuitry 700 of FIG. 7 and/or the FPGA circuitry 800 of FIG. 8 may be in one or more packages. In some examples, an XPU may be implemented by the processor circuitry 612 of FIG. 6, which may be in one or more packages. For example, the XPU may include a CPU in one package, a DSP in another package, a GPU in yet another package, and an FPGA in still yet another package.

Figure 9:
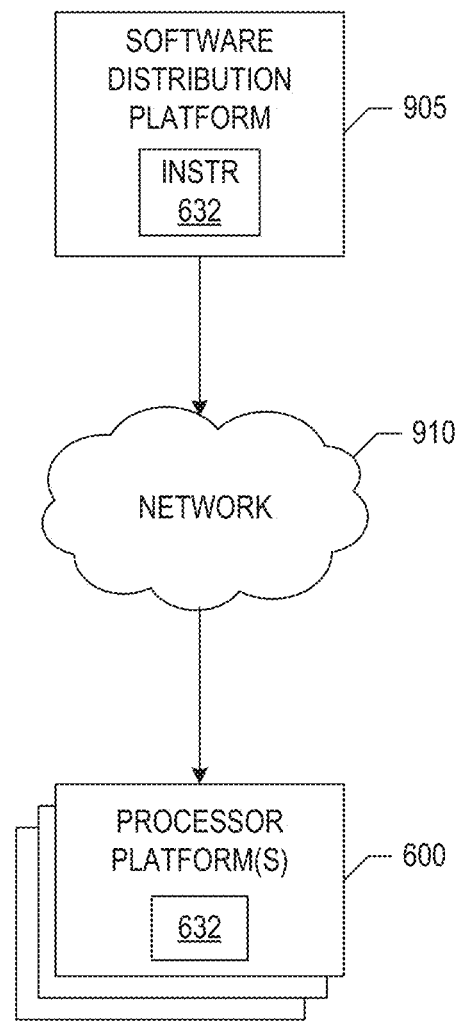
FIG. 9 is a block diagram of an example software distribution platform (e.g., one or more servers) to distribute software (e.g., software corresponding to the example machine readable instructions of FIG. 5) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 905 to distribute software such as the example machine readable instructions 632 of FIG. 6 to hardware devices owned and/or operated by third parties is illustrated in FIG. 9. The example software distribution platform 905 may be implemented by any computer server, data facility, cloud service, etc., capable of storing and transmitting software to other computing devices. The third parties may be customers of the entity owning and/or operating the software distribution platform 905. For example, the entity that owns and/or operates the software distribution platform 905 may be a developer, a seller, and/or a licensor of software such as the example machine readable instructions 632 of FIG. 6. The third parties may be consumers, users, retailers, OEMs, etc., who purchase and/or license the software for use and/or re-sale and/or sub-licensing. In the illustrated example, the software distribution platform 905 includes one or more servers and one or more storage devices. The storage devices store the machine readable instructions 632, which may correspond to the example machine readable instructions 500 of FIG. 5, as described above. The one or more servers of the example software distribution platform 905 are in communication with a network 910, which may correspond to any one or more of the Internet and/or any of the example networks 626 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 632 from the software distribution platform 905. For example, the software, which may correspond to the example machine readable instructions 500 of FIG. 5, may be downloaded to the example processor platform 600, which is to execute the machine readable instructions 632 to implement the example video conferencing circuitry 112. In some example, one or more servers of the software distribution platform 905 periodically offer, transmit, and/or force updates to the software (e.g., the example machine readable instructions 632 of FIG. 6) to ensure improvements, patches, updates, etc., are distributed and applied to the software at the end user devices.

From the foregoing, it will be appreciated that example systems, methods, apparatus, and articles of manufacture have been disclosed that to enable private verbal side conversations in virtual meetings. The disclosed systems, methods, apparatus, and articles of manufacture provide verbal communication between specific participants in a video conferencing meeting to allow fast, direct interaction without disruption to the remaining participants and/or the main speaker in the video conferencing meeting. The disclosed systems, methods, apparatus, and articles of manufacture use binaural audio processing to allow a listener to prioritize and choose to whom to listen (e.g., between the main presenter of the primary audio channel or the fellow participant(s) of the secondary audio channel). The disclosed systems, methods, apparatus, and articles of manufacture apply the binaural audio processing to enhance intelligibility of the different audio and avoid interference between the different voices of the audio channels by reducing perceptual crosstalk even if the main speaker and fellow participant(s) are talking at the same time.

Example methods, apparatus, systems, and articles of manufacture to enable private verbal side conversations in virtual meetings are disclosed herein. Further examples and combinations thereof include the following:

Example 1 includes an apparatus comprising at least one memory, instructions in the apparatus, and processor circuitry to execute the instructions to join a video conferencing meeting including a first audio channel, the first audio channel including first binaural audio at a first angle, in response to a user joining a second audio channel in the video conferencing meeting, select a second angle for the second audio channel and a third angle for the first audio channel, generate a superimposed binaural audio including second binaural audio for the second audio channel and third binaural audio for the first audio channel, and output the superimposed binaural audio such that first audio data from the first audio channel included in the third binaural audio is to appear to originate from a first position based on the third angle and second audio data from the second audio channel included in the second binaural audio is to appear to originate from a second position based on the second angle.

Example 2 includes the apparatus of example 1, wherein the processor circuitry is to determine a list of participants in the video conferencing meeting, and determine the user joined the second audio channel based on at least one of (a) the user selection of a participant from the list of participants in the video conferencing meeting to join the second audio channel, or (b) the user selection to join the second audio channel based on a request from a participant in the video conferencing meeting.

Example 3 includes the apparatus of example 1, wherein the first angle is 90 degrees and in front of the user, and the second angle and the third angle are less than the first angle.

Example 4 includes the apparatus of example 1, wherein the superimposed binaural audio is output to an audio device having a right side and a left side, and wherein the processor circuitry is to generate the second binaural audio based on the second audio channel and the second angle, and generate the third binaural audio based on the first audio channel and the third angle.

Example 5 includes the apparatus of example 4, wherein the processor circuitry is to generate the second binaural audio using a first digital filter for the right side of the audio device and a second digital filter for the left side of the audio device, and generate the third binaural audio using a third digital filter for the right side of the audio device and a fourth digital filter for the left side of the audio device.

Example 6 includes the apparatus of example 5, wherein the first digital filter, the second digital filter, the third digital filter, and the fourth digital filter are head related transfer functions.

Example 7 includes the apparatus of example 1, wherein the processor circuitry is to display an indication that the user has joined the second audio channel on a user interface.

Example 8 includes the apparatus of example 1, wherein the first audio channel includes the user and all participants included in a list of participants in the video conferencing meeting.

Example 9 includes the apparatus of example 8, wherein the second audio channel includes the user and fewer than all participants in the list of participants.

Example 10 includes the apparatus of example 9, wherein the second audio channel includes the user and one participant in the list of participants.

Example 11 includes the apparatus of example 1, wherein the superimposed binaural audio is a first superimposed binaural audio, and wherein the processor circuitry is to determine if the user joins a third audio channel, wherein the third audio channel includes the user and fewer than all participants included in the video conferencing meeting, in response to the user joining the third audio channel, select a plurality of angles for the third audio channel and a fourth angle for the first audio channel, the plurality of angles equal to a number of participants included in the third audio channel, determine a plurality of binaural audio based on the third audio channel and the plurality of angles, determine fourth binaural audio based on the first audio channel and the fourth angle, determine a second superimposed binaural audio including the plurality of binaural audio and the fourth binaural audio, and output the second superimposed binaural audio such that the first audio data from the first audio channel included in the fourth binaural audio is to appear to originate from a third position based on the fourth angle and a plurality of audio data from the third audio channel included in the plurality of binaural audio is to appear to originate from a plurality of positions based on the plurality of angles.

Example 12 includes a non-transitory computer readable storage medium comprising instructions that, when executed, cause at least one processor to at least join a video conferencing meeting including a first audio channel, the first audio channel including first binaural audio at a first angle, in response to a user joining a second audio channel in the video conferencing meeting, select a second angle for the second audio channel and a third angle for the first audio channel, generate a superimposed binaural audio including second binaural audio for the second audio channel and third binaural audio for the first audio channel, and output the superimposed binaural audio such that first audio data from the first audio channel included in the third binaural audio is to appear to originate from a first position based on the third angle and second audio data from the second audio channel included in the second binaural audio is to appear to originate from a second position based on the second angle.

Example 13 includes the non-transitory computer readable storage medium of example 12, wherein the instructions, when executed, cause the at least one processor to determine a list of participants in the video conferencing meeting, and determine the user joined the second audio channel based on at least one of (a) the user selection of a participant from the list of participants in the video conferencing meeting to join the second audio channel, or (b) the user selection to join the second audio channel based on a request from a participant in the video conferencing meeting.

Example 14 includes the non-transitory computer readable storage medium of example 12, wherein the first angle is 90 degrees and in front of the user, and the second angle and the third angle are less than the first angle.

Example 15 includes the non-transitory computer readable storage medium of example 12, wherein the superimposed binaural audio is output to an audio device having a right side and a left side, and wherein the instructions, when executed, cause the at least one processor to generate second binaural audio based on the second audio channel and the second angle, and generate third binaural audio based on the first audio channel and the third angle. determine the second binaural audio using a first digital filter for the right side of the audio device and a second digital filter for the left side of the audio device.

Example 16 includes the non-transitory computer readable storage medium of example 15, wherein the instructions, when executed, cause the at least one processor to generate the second binaural audio using a first digital filter for the right side of the audio device and a second digital filter for the left side of the audio device, and generate the third binaural audio using a third digital filter for the right side of the audio device and a fourth digital filter for the left side of the audio device.

Example 17 includes the non-transitory computer readable storage medium of example 16, wherein the first digital filter, the second digital filter, the third digital filter, and the fourth digital filter are head related transfer functions.

Example 18 includes the non-transitory computer readable storage medium of example 12, wherein the instructions, when executed, cause the at least one processor to display an indication that the user has joined the second audio channel on a user interface.

Example 19 includes the non-transitory computer readable storage medium of example 12, wherein the first audio channel includes the user and all participants included in a list of participants in the video conferencing meeting.

Example 20 includes the non-transitory computer readable storage medium of example 19, wherein the second audio channel includes the user and fewer than all participants in the list of participants.

Example 21 includes the non-transitory computer readable storage medium of example 20, wherein the second audio channel includes the user and one participant in the list of participants.

Example 22 includes the non-transitory computer readable storage medium of example 12, wherein the superimposed binaural audio is a first superimposed binaural audio, and wherein the instructions, when executed, cause the at least one processor to determine if the user joins a third audio channel, wherein the third audio channel includes the user and fewer than all participants included in the video conferencing meeting, in response to the user joining the third audio channel, select a plurality of angles for the third audio channel and a fourth angle for the first audio channel, the plurality of angles equal to a number of participants included in the third audio channel, determine a plurality of binaural audio based on the third audio channel and the plurality of angles, determine fourth binaural audio based on the first audio channel and the fourth angle, determine a second superimposed binaural audio including the plurality of binaural audio and the fourth binaural audio, and output the second superimposed binaural audio such that the first audio data from the first audio channel included in the fourth binaural audio is to appear to originate from a third position based on the fourth angle and a plurality of audio data from the third audio channel included in the plurality of binaural audio is to appear to originate from a plurality of positions based on the plurality of angles.

Example 23 includes a method comprising joining a video conferencing meeting including a first audio channel, the first audio channel including first binaural audio at a first angle, in response to a user joining a second audio channel in the video conferencing meeting, selecting a second angle for the second audio channel and a third angle for the first audio channel, generating a superimposed binaural audio including second binaural audio for the second audio channel and third binaural audio for the first audio channel, and outputting the superimposed binaural audio such that first audio data from the first audio channel included in the third binaural audio is to appear to originate from a first position based on the third angle and second audio data from the second audio channel included in the second binaural audio is to appear to originate from a second position based on the second angle.

Example 24 includes the method of example 23, further including determining a list of participants in the video conferencing meeting, and determining the user joined the second audio channel based on at least one of (a) the user selection of a participant from the list of participants in the video conferencing meeting to join the second audio channel, or (b) the user selection to join the second audio channel based on a request from a participant in the video conferencing meeting.

Example 25 includes the method of example 23, wherein the first angle is 90 degrees and in front of the user, and the second angle and the third angle are less than the first angle.

Example 26 includes the method of example 23, wherein the superimposed binaural audio is output to an audio device having a right side and a left side, and further including generating second binaural audio based on the second audio channel and the second angle, and generating third binaural audio based on the first audio channel and the third angle.

Example 27 includes the method of example 26, further including generating the second binaural audio using a first digital filter for the right side of the audio device and a second digital filter for the left side of the audio device, and generating the third binaural audio using a third digital filter for the right side of the audio device and a fourth digital filter for the left side of the audio device.

Example 28 includes the method of example 27, wherein the first digital filter, the second digital filter, the third digital filter, and the fourth digital filter are head related transfer functions.

Example 29 includes the method of example 23, further including displaying an indication that the user has joined the second audio channel on a user interface.

Example 30 includes the method of example 23, wherein the first audio channel includes the user and all participants included in a list of participants in the video conferencing meeting.

Example 31 includes the method of example 30, wherein the second audio channel includes the user and fewer than all participants in the list of participants.

Example 32 includes the method of example 31, wherein the second audio channel includes the user and one participant in the list of participants.

Example 33 includes the method of example 23, further including determining if the user joins a third audio channel, wherein the third audio channel includes the user and fewer than all participants included in the video conferencing meeting, in response to the user joining the third audio channel, selecting a plurality of angles for the third audio channel and a fourth angle for the first audio channel, the plurality of angles equal to a number of participants included in the third audio channel, determining a plurality of binaural audio based on the third audio channel and the plurality of angles, determining fourth binaural audio based on the first audio channel and the fourth angle, determining a second superimposed binaural audio including the plurality of binaural audio and the fourth binaural audio, and outputting the second superimposed binaural audio such that the first audio data from the first audio channel included in the fourth binaural audio is to appear to originate from a third position based on the fourth angle and a plurality of audio data from the third audio channel included in the plurality of binaural audio is to appear to originate from a plurality of positions based on the plurality of angles.

Example 34 includes an apparatus comprising participant determination circuitry to join a video conferencing meeting including a first audio channel, the first audio channel including first binaural audio at a first angle, secondary channel determination circuitry to, in response to a user joining a second audio channel in the video conferencing meeting, select a second angle for the second audio channel and a third angle for the first audio channel, output audio management circuitry to generate a superimposed binaural audio including second binaural audio for the second audio channel and third binaural audio for the first audio channel, and output the superimposed binaural audio such that first audio data from the first audio channel included in the third binaural audio is to appear to originate from a first position based on the third angle and second audio data from the second audio channel included in the second binaural audio is to appear to originate from a second position based on the second angle.

Example 35 includes the apparatus of example 34, wherein the participant determination circuitry is to determine a list of participants in the video conferencing meeting, and further including channel selection circuitry to determine the user joined the second audio channel based on at least one of (a) the user selection of a participant from the list of participants in the video conferencing meeting to join the second audio channel, or (b) the user selection to join the second audio channel based on a request from a participant in the video conferencing meeting.

Example 36 includes the apparatus of example 34, wherein the first angle is 90 degrees and in front of the user, and the second angle and the third angle are less than the first angle.

Example 37 includes the apparatus of example 34, wherein the superimposed binaural audio is output to an audio device having a right side and a left side, and further including secondary channel audio processing circuitry to generate second binaural audio based on the second audio channel and the second angle, and primary audio channel processing circuitry is to generate third binaural audio based on the first audio channel and the third angle.

Example 38 includes the apparatus of example 37, wherein the secondary channel audio processing circuitry is to generate the second binaural audio using a first digital filter for the right side of the audio device and a second digital filter for the left side of the audio device, and the primary audio channel processing circuitry is to generate the third binaural audio using a third digital filter for the right side of the audio device and a fourth digital filter for the left side of the audio device.

Example 39 includes the apparatus of example 38, wherein the first digital filter, the second digital filter, the third digital filter, and the fourth digital filter are head related transfer functions.

Example 40 includes the apparatus of example 34, further including a user interface to display an indication that the user has joined the second audio channel.

Example 41 includes the apparatus of example 34, wherein the first audio channel includes the user and all participants included in a list of participants in the video conferencing meeting.

Example 42 includes the apparatus of example 41, wherein the second audio channel includes the user and fewer than all participants in the list of participants.

Example 43 includes the apparatus of example 42, wherein the second audio channel includes the user and one participant in the list of participants.

Example 44 includes the apparatus of example 34, further including channel selection circuitry to determine if the user joins a third audio channel, wherein the third audio channel includes the user and fewer than all participants included in the video conferencing meeting, wherein the superimposed binaural audio is a first superimposed binaural audio, and wherein the secondary channel determination circuitry is to, in response to the user joining the third audio channel, select a plurality of angles for the third audio channel and a fourth angle for the first audio channel, the plurality of angles equal to a number of participants included in the third audio channel, secondary channel audio processing circuitry to determine a plurality of binaural audio based on the third audio channel and the plurality of angles, primary audio channel processing circuitry to determine fourth binaural audio based on the first audio channel and the fourth angle, and the output audio management circuitry is to determine a second superimposed binaural audio including the plurality of binaural audio and the fourth binaural audio, and output the second superimposed binaural audio such that the first audio data from the first audio channel included in the fourth binaural audio is to appear to originate from a third position based on the fourth angle and a plurality of audio data from the third audio channel included in the plurality of binaural audio is to appear to originate from a plurality of positions based on the plurality of angles.

Example 45 includes an apparatus comprising means for joining a video conferencing meeting including a first audio channel, the first audio channel including first binaural audio at a first angle, means for selecting, in response to a user joining a second audio channel in the video conferencing meeting, a second angle for the second audio channel and a third angle for the first audio channel, means for outputting audio, the means for outputting to generate a superimposed binaural audio including second binaural audio for the second audio channel and third binaural audio for the first audio channel, and output the superimposed binaural audio such that first audio data from the first audio channel included in the third binaural audio is to appear to originate from a first position based on the third angle and second audio data from the second audio channel included in the second binaural audio is to appear to originate from a second position based on the second angle.

Example 46 includes the apparatus of example 45, further including first means for determining a list of participants in the video conferencing meeting, and second means for determining the user joined the second audio channel based on at least one of (a) the user selection of a participant from the list of participants in the video conferencing meeting to join the second audio channel, or (b) the user selection to join the second audio channel based on a request from a participant in the video conferencing meeting.

Example 47 includes the apparatus of example 45, wherein the first angle is 90 degrees and in front of the user, and the second angle and the third angle are less than the first angle.

Example 48 includes the apparatus of example 45, wherein the superimposed binaural audio is output to an audio device having a right side and a left side, and further including first means for generating second binaural audio based on the second audio channel and the second angle, and second means for generating third binaural audio based on the first audio channel and the third angle. determine the second binaural audio using a first digital filter for the right side of the audio device and a second digital filter for the left side of the audio device.

Example 49 includes the apparatus of example 48, wherein the first means for generating is to generate the second binaural audio using a first digital filter for the right side of the audio device and a second digital filter for the left side of the audio device the second means for generating is to generate the third binaural audio using a third digital filter for the right side of the audio device and a fourth digital filter for the left side of the audio device.

Example 50 includes the apparatus of example 49, wherein the first digital filter, the second digital filter, the third digital filter, and the fourth digital filter are head related transfer functions.

Example 51 includes the apparatus of example 45, further including means for displaying an indication that the user has joined the second audio channel.

Example 52 includes the apparatus of example 45, wherein the first audio channel includes the user and all participants included in a list of participants in the video conferencing meeting.

Example 53 includes the apparatus of example 52, wherein the second audio channel includes the user and fewer than all participants in the list of participants.

Example 54 includes the apparatus of example 53, wherein the second audio channel includes the user and one participant in the list of participants.

Example 55 includes the apparatus of example 45, further including second means for determining if the user joins a third audio channel, wherein the third audio channel includes the user and fewer than all participants included in the video conferencing meeting, wherein the superimposed binaural audio is a first superimposed binaural audio, and wherein the means for selecting is to, in response to the user joining the third audio channel, select a plurality of angles for the third audio channel and a fourth angle for the first audio channel, the plurality of angles equal to a number of participants included in the third audio channel, first means for generating to determine a plurality of binaural audio based on the third audio channel and the plurality of angles, second means for generating to determine fourth binaural audio based on the first audio channel and the fourth angle, and the means for outputting is to determine a second superimposed binaural audio including the plurality of binaural audio and the fourth binaural audio, and output the second superimposed binaural audio such that the first audio data from the first audio channel included in the fourth binaural audio is to appear to originate from a third position based on the fourth angle and a plurality of audio data from the third audio channel included in the plurality of binaural audio is to appear to originate from a plurality of positions based on the plurality of angles.

Example 56 includes an apparatus comprising at least one memory, and processor circuitry including one or more of at least one of a central processing unit, a graphic processing unit or a digital signal processor, the at least one of the central processing unit, the graphic processing unit or the digital signal processor having control circuitry to control data movement within the processor circuitry, arithmetic and logic circuitry to perform one or more first operations corresponding to instructions, and one or more registers to store a result of the one or more first operations, the instructions in the apparatus, a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations, or Application Specific Integrate Circuitry including logic gate circuitry to perform one or more third operations, the processor circuitry to at least one of perform at least one of the first operations, the second operations or the third operations to join a video conferencing meeting including a first audio channel, the first audio channel including first binaural audio at a first angle, in response to a user joining a second audio channel in the video conferencing meeting, select a second angle for the second audio channel and a third angle for the first audio channel, generate a superimposed binaural audio including second binaural audio for a second audio channel and third binaural audio for a first audio channel, and output the superimposed binaural audio such that first audio data from the first audio channel included in the third binaural audio is to appear to originate from a first position based on the third angle and second audio data from the second audio channel included in the second binaural audio is to appear to originate from a second position based on the second angle.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
at least one memory;
instructions; and
at least one processor circuit to execute the instructions to:
 join a video conferencing meeting including a first audio channel, the first audio channel including first binaural audio at a first binaural angle, the first audio channel including a user and all participants in attendance in the video conferencing meeting;
 in response to the user joining a second audio channel in the video conferencing meeting:
  select a second binaural angle for the second audio channel, the second audio channel including the user and fewer than all participants in attendance in the video conferencing meeting, and
  move the first audio channel to a third binaural angle, the third binaural angle different than the first binaural angle;
 generate superimposed binaural audio including second binaural audio for the second audio channel at the second binaural angle and third binaural audio for the first audio channel and the third binaural angle;
 output the superimposed binaural audio to an audio device having a right side and a left side;
 generate the second binaural audio based on the second audio channel and the second binaural angle, the second binaural audio generated using a first digital filter for the right side of the audio device and a second digital filter for the left side of the audio device; and
 generate the third binaural audio based on the first audio channel and the third binaural angle, the third binaural audio generated using a third digital filter for the right side of the audio device and a fourth digital filter for the left side of the audio device.

2. The apparatus of claim 1, wherein one or more of the at least one processor circuit is to:
 determine a list of participants in the video conferencing meeting; and
 determine the user joined the second audio channel based on at least one of (a) selection by the user of a participant from the list of participants in the video conferencing meeting to join the second audio channel, or (b) selection by the user to join the second audio channel based on a request from a participant in the video conferencing meeting.

3. The apparatus of claim 1, wherein the first binaural angle is 90 degrees and in front of the user, and the second binaural angle and the third binaural angle are less than the first binaural angle.

4. The apparatus of claim 1, wherein the first digital filter, the second digital filter, the third digital filter, and the fourth digital filter are head related transfer functions.

5. The apparatus of claim 1, wherein one or more of the at least one processor circuit is to cause display of an indication that the user has joined the second audio channel on a user interface.

6. The apparatus of claim 1, wherein the second audio channel includes the user and only one participant.

7. The apparatus of claim 1, wherein one or more of the at least one processor circuitry is to output the superimposed binaural audio such that first audio data from the first audio channel included in the third binaural audio is to appear to originate from a first position based on the third binaural angle and second audio data from the second audio channel included in the second binaural audio is to appear to originate from a second position based on the second binaural angle.

8. The apparatus of claim 7, wherein the superimposed binaural audio is a first superimposed binaural audio, and wherein one or more of the at least one processor circuit is to:
 determine if the user joins a third audio channel, wherein the third audio channel includes the user and fewer than all participants in attendance in the video conferencing meeting;
 in response to the user joining the third audio channel:
  select a plurality of binaural angles for the third audio channel, the plurality of binaural angles equal to a number of participants included in the third audio channel;
  determine a plurality of binaural audio based on the third audio channel and the plurality of binaural angles;
  move the first audio channel to a fourth binaural angle, the fourth a binaural angle different than the third binaural angle; and
  determine fourth binaural audio based on the first audio channel and the fourth binaural angle;
 determine a second superimposed binaural audio including the plurality of binaural audio and the fourth binaural audio; and
 output the second superimposed binaural audio such that the first audio data from the first audio channel included in the fourth binaural audio is to appear to originate from a third position based on the fourth binaural angle and a plurality of audio data from the third audio channel included in the plurality of binaural audio is to appear to originate from a plurality of positions based on the plurality of binaural angles.

9. A non-transitory computer readable storage medium comprising instructions that, when executed, cause at least one processor circuit to at least:
   join a video conferencing meeting including a first audio channel, the first audio channel including first binaural audio at a first binaural angle, the first audio channel including a user and all participants who joined the video conferencing meeting;
   in response to the user joining a second audio channel in the video conferencing meeting:
      select a second binaural angle for the second audio channel, the second audio channel including the user and fewer than all participants who joined the video conferencing meeting; and
      move the first audio channel to a third binaural angle, the third binaural angle different than the first binaural angle;
   generate a superimposed binaural audio including second binaural audio for the second audio channel at the second binaural angle and third binaural audio for the first audio channel at the third binaural angle;
   output the superimposed binaural audio to an audio device having a right side and a left side;
   generate the second binaural audio based on the second audio channel and the second binaural angle, the second binaural audio generated using a first digital filter for the right side of the audio device and a second digital filter for the left side of the audio device; and
   generate the third binaural audio based on the first audio channel and the third binaural angle, the third binaural audio generated using a third digital filter for the right side of the audio device and a fourth digital filter for the left side of the audio device.

10. The non-transitory computer readable storage medium of claim 9, wherein the instructions are to cause the at least one processor to:
   determine a list of participants in the video conferencing meeting; and
   determine the user joined the second audio channel based on at least one of (a) the user selection of a participant from the list of participants in the video conferencing meeting to join the second audio channel, or (b) the user selection to join the second audio channel based on a request from a participant in the video conferencing meeting.

11. The non-transitory computer readable storage medium of claim 9, wherein the first binaural angle is 90 degrees and in front of the user, and the second binaural angle and the third binaural angle are less than the first binaural angle.

12. The non-transitory computer readable storage medium of claim 9, wherein the first digital filter, the second digital filter, the third digital filter, and the fourth digital filter are head related transfer functions.

13. The non-transitory computer readable storage medium of claim 9, wherein the instructions are to the at least one processor to display an indication that the user has joined the second audio channel on a user interface.

14. The non-transitory computer readable storage medium of claim 9, wherein the second audio channel includes the user and only one participant.

15. The non-transitory computer readable storage medium of claim 9, wherein the instructions are to cause the at least one processor to output the superimposed binaural audio such that first audio data from the first audio channel included in the third binaural audio is to appear to originate from a first position based on the third binaural angle and second audio data from the second audio channel included in the second binaural audio is to appear to originate from a second position based on the second binaural angle.

16. The non-transitory computer readable storage medium of claim 15, wherein the superimposed binaural audio is a first superimposed binaural audio, and wherein the instructions, when executed, cause the at least one processor to:
   determine if the user joins a third audio channel, wherein the third audio channel includes the user and fewer than all participants who joined the video conferencing meeting;
   in response to the user joining the third audio channel:
      select a plurality of binaural angles for the third audio channel, the plurality of binaural angles equal to a number of participants included in the third audio channel;
      determine a plurality of binaural audio based on the third audio channel and the plurality of binaural angles;
      move the first audio channel to a fourth binaural angle, the fourth binaural angle different than the third binaural angle; and
      determine fourth binaural audio based on the first audio channel and the fourth binaural angle;
   determine second superimposed binaural audio including the plurality of binaural audio and the fourth binaural audio; and
   output the second superimposed binaural audio such that the first audio data from the first audio channel included in the fourth binaural audio is to appear to originate from a third position based on the fourth binaural angle and a plurality of audio data from the third audio channel included in the plurality of binaural audio is to appear to originate from a plurality of positions based on the plurality of binaural angles.

17. A method comprising:
   joining a video conferencing meeting including a first audio channel, the first audio channel including first binaural audio at a first binaural angle, the first audio channel including a user and all participants who joined the video conferencing meeting;
   in response to the user joining a second audio channel in the video conferencing meeting:
      selecting a second binaural angle for the second audio channel, the second audio channel including the user and fewer than all participants who joined the video conferencing meeting; and
      moving the first audio channel to a third binaural angle, the third binaural angle different than the first binaural angle;
   generating superimposed binaural audio including second binaural audio for the second audio channel and third binaural audio for the first audio channel;
   outputting the superimposed binaural audio to an audio device having a right side and a left side;
   generating the second binaural audio based on the second audio channel and the second binaural angle, the second binaural audio generated using a first digital filter for the right side of the audio device and a second digital filter for the left side of the audio device; and
   generating the third binaural audio based on the first audio channel and the third binaural angle, the third binaural audio generated using a third digital filter for the right side of the audio device and a fourth digital filter for the left side of the audio device.

18. The method of claim 17, further including:
   determining a list of participants in the video conferencing meeting; and determining the user joined the second audio channel based on at least one of (a) the user selection of a participant from the list of participants in the video conferencing meeting to join the second audio channel, or (b) the user selection to join the second audio channel based on a request from a participant in the video conferencing meeting.

19. The method of claim 17, wherein the outputting of the superimposed binaural audio including outputting the superimposed binaural audio such that first audio data from the first audio channel included in the third binaural audio is to appear to originate from a first position based on the third binaural angle and second audio data from the second audio channel included in the second binaural audio is to appear to originate from a second position based on the second binaural angle.

* * * * *